US012614379B2

(12) United States Patent
Tang et al.

(10) Patent No.: US 12,614,379 B2
(45) Date of Patent: Apr. 28, 2026

(54) OBJECT DETECTION METHOD AND DEVICE, AND OBJECT DETECTION MODULE TRAINING METHOD AND DEVICE

(71) Applicant: BOE TECHNOLOGY GROUP CO., LTD., Beijing (CN)

(72) Inventors: Xiaojun Tang, Beijing (CN); Rui Zheng, Beijing (CN); Ruijiao Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 309 days.

(21) Appl. No.: 18/291,391

(22) PCT Filed: Feb. 24, 2023

(86) PCT No.: PCT/CN2023/078250
§ 371 (c)(1),
(2) Date: Jan. 23, 2024

(87) PCT Pub. No.: WO2023/160666
PCT Pub. Date: Aug. 31, 2023

(65) Prior Publication Data
US 2024/0355095 A1 Oct. 24, 2024

(30) Foreign Application Priority Data
Feb. 25, 2022 (WO) ................ PCT/CN2022/078114

(51) Int. Cl.
*G06V 10/774* (2022.01)
*G06V 10/40* (2022.01)
(Continued)

(52) U.S. Cl.
CPC ............ *G06V 10/774* (2022.01); *G06V 10/40* (2022.01); *G06V 10/764* (2022.01);
(Continued)

(58) Field of Classification Search
CPC .... G06V 10/774; G06V 10/764; G06V 10/82; G06V 20/70; G06V 10/7753;
(Continued)

(56) References Cited

U.S. PATENT DOCUMENTS

| | | | |
|---|---|---|---|
| 2014/0099020 A1 | 4/2014 | Ko et al. | |
| 2014/0247987 A1 | 9/2014 | Nomoto | |

(Continued)

FOREIGN PATENT DOCUMENTS

| | | |
|---|---|---|
| CN | 106373394 A | 2/2017 |
| CN | 108764932 A | 11/2018 |

(Continued)

OTHER PUBLICATIONS

Zhao, Xiangyun, et al. "Object detection with a unified label space from multiple datasets." European conference on computer vision . Cham: Springer International Publishing, 2020. (Year: 2020).*

(Continued)

*Primary Examiner* — Raphael Schwartz
(74) *Attorney, Agent, or Firm* — Dority & Manning, P.A.

(57) ABSTRACT

An object detection method includes: acquiring an image to be detected; and processing the image to be detected by using an object detection model to obtain an object detection result corresponding to a target object to be detected in the image to be detected. The object detection model includes a feature extraction network and an object detection network. The feature extraction network is used to extract features of the image to be detected to obtain image features related to multiple classes of tar-get objects, and the object detection network is used to process the image features to obtain the object detection result. The object detection network includes a class channel layer, multiple object channel layers and multiple box channel layers.

18 Claims, 10 Drawing Sheets

(51) Int. Cl.

| | |
|---|---|
| *G06V 10/764* | (2022.01) |
| *G06V 10/77* | (2022.01) |
| *G06V 10/776* | (2022.01) |
| *G06V 10/778* | (2022.01) |
| *G06V 10/80* | (2022.01) |
| *G06V 10/82* | (2022.01) |
| *G06V 20/70* | (2022.01) |

(52) U.S. Cl.
    CPC ........ *G06V 10/7715* (2022.01); *G06V 10/776* (2022.01); *G06V 10/778* (2022.01); *G06V 10/806* (2022.01); *G06V 10/82* (2022.01); *G06V 20/70* (2022.01)

(58) Field of Classification Search
    CPC ................ G06N 3/0895; G06N 3/0464; G06T 2207/20081; G06T 2207/20084; G06F 18/214
    See application file for complete search history.

(56) References Cited

U.S. PATENT DOCUMENTS

| | | |
|---|---|---|
| 2021/0042580 A1 | 2/2021 | Chen et al. |
| 2021/0150282 A1 | 5/2021 | Chadha et al. |
| 2021/0248470 A1 | 8/2021 | Kaskari |

FOREIGN PATENT DOCUMENTS

| | | | | |
|---|---|---|---|---|
| CN | 109325538 | A | 2/2019 | |
| CN | 109871730 | A | 6/2019 | |
| CN | 110348303 | A | 10/2019 | |
| CN | 110349148 | A | 10/2019 | |
| CN | 110942449 | A | 3/2020 | |
| CN | 111091105 | A | 5/2020 | |
| CN | 111860510 | A | 10/2020 | |
| CN | 111915020 | A | 11/2020 | |
| CN | 109325538 | B * | 12/2020 | ............ G06F 18/25 |
| CN | 112418278 | A | 2/2021 | |
| CN | 112488098 | A | 3/2021 | |
| CN | 112560999 | A | 3/2021 | |
| CN | 113095434 | A | 7/2021 | |
| CN | 113537106 | B * | 7/2021 | |
| CN | 113239982 | A | 8/2021 | |
| CN | 113537106 | A | 10/2021 | |

OTHER PUBLICATIONS

Zhou, Xingyi, Vladlen Koltun, and Philipp Krähenbühl. "Simple multi-dataset detection." arXiv:2102.13086v1 [cs. CV] Feb. 25, 2021 (Year: 2021).*

Chinese First Office Action (with English translation) for corresponding Application No. CN202380007919.0, dated Sep. 16, 2025, 20 pages.

PCT International Search Report (w/ English translation) and Written Opinion for corresponding PCT Application No. PCT/CN2023/078250, dated May 22, 2023, 11 pages.

PCT International Search Report and Written Opinion (w/ English translations) for corresponding PCT Application No. PCT/CN2022/078114, dated Oct. 25, 2022, 17 pages.

* cited by examiner

Detection network 223

Object channel layer 31

Object channel layer 31

Box channel layers 32

Box channel layers 32

Class channel layer 33

Object detection system 40

Image acquisition device 41

Detection processing device 42

Interaction device 43

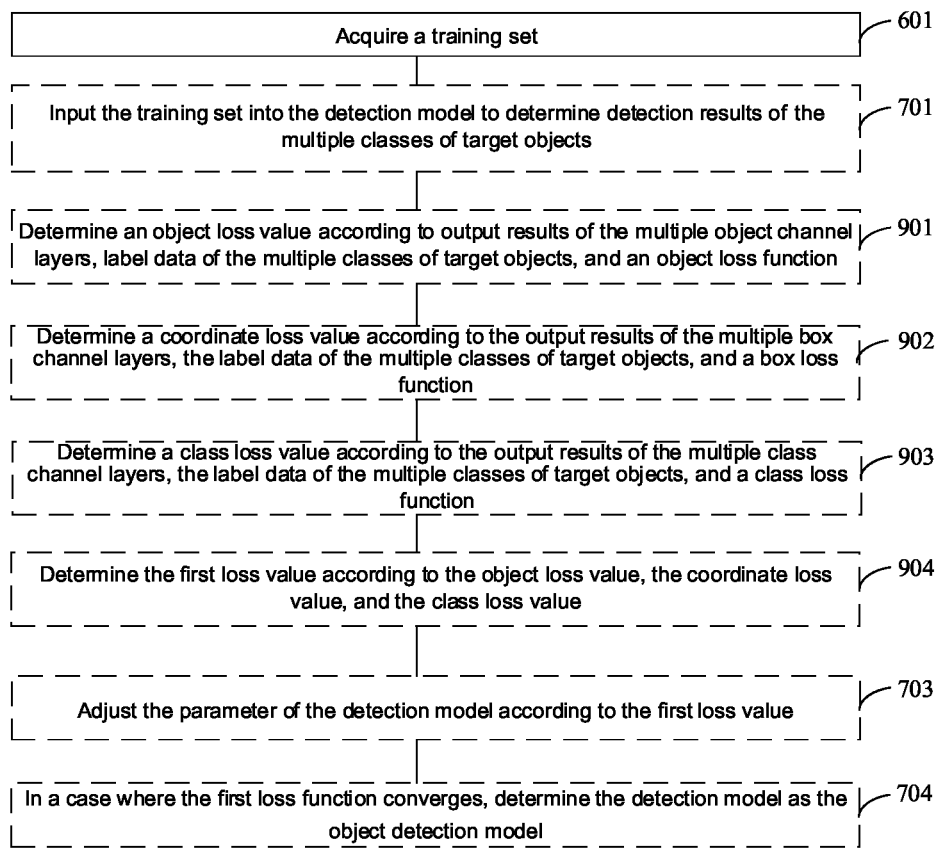

Acquire a training set — 601

Input the training set into the detection model to determine detection results of the multiple classes of target objects — 701

Determine an object loss value according to output results of the multiple object channel layers, label data of the multiple classes of target objects, and an object loss function — 901

Determine a coordinate loss value according to the output results of the multiple box channel layers, the label data of the multiple classes of target objects, and a box loss function — 902

Determine a class loss value according to the output results of the multiple class channel layers, the label data of the multiple classes of target objects, and a class loss function — 903

Determine the first loss value according to the object loss value, the coordinate loss value, and the class loss value — 904

Adjust the parameter of the detection model according to the first loss value — 703

In a case where the first loss function converges, determine the detection model as the object detection model — 704

FIG. 9

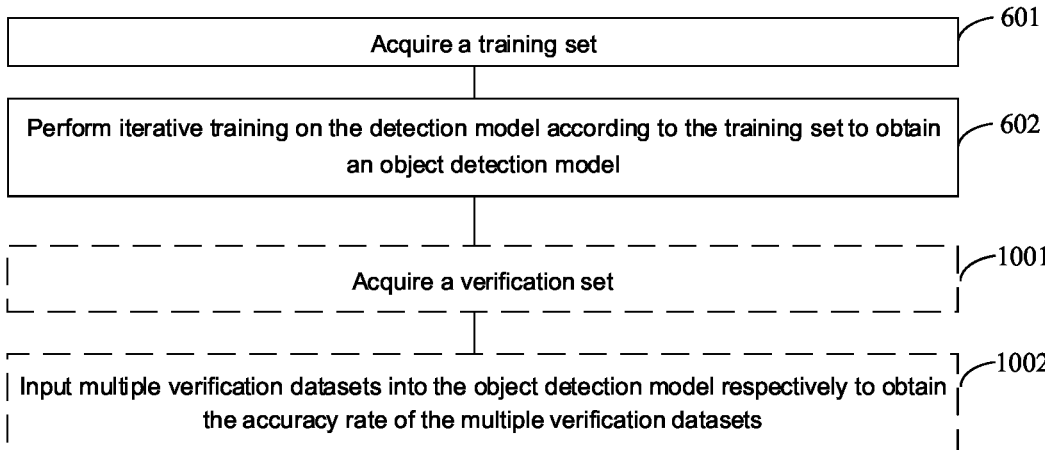

Acquire a training set — 601

Perform iterative training on the detection model according to the training set to obtain an object detection model — 602

Acquire a verification set — 1001

Input multiple verification datasets into the object detection model respectively to obtain the accuracy rate of the multiple verification datasets — 1002

FIG. 10

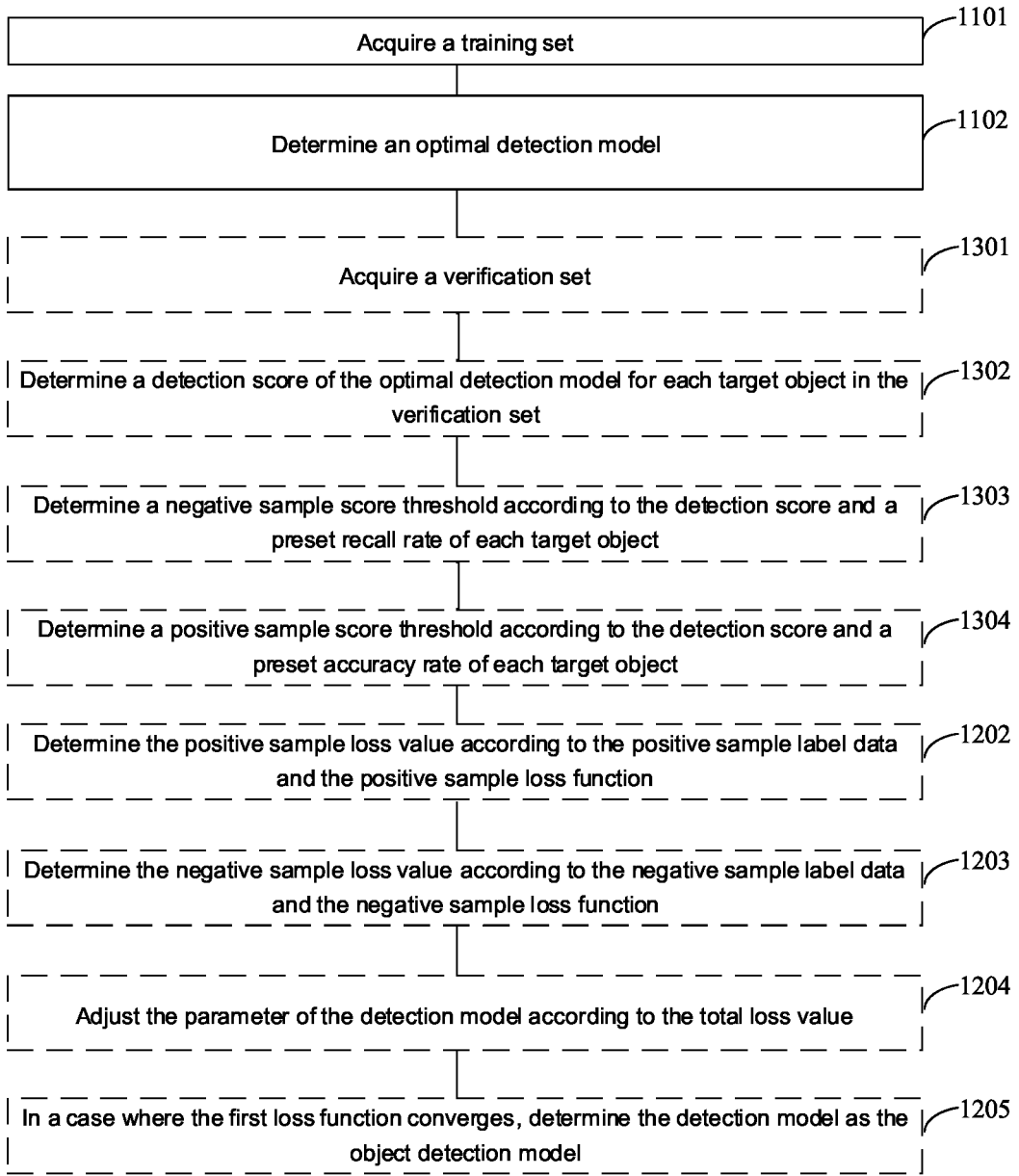

Acquire a training set ⟋1101

Determine an optimal detection model ⟋1102

Acquire a verification set ⟋1301

Determine a detection score of the optimal detection model for each target object in the verification set ⟋1302

Determine a negative sample score threshold according to the detection score and a preset recall rate of each target object ⟋1303

Determine a positive sample score threshold according to the detection score and a preset accuracy rate of each target object ⟋1304

Determine the positive sample loss value according to the positive sample label data and the positive sample loss function ⟋1202

Determine the negative sample loss value according to the negative sample label data and the negative sample loss function ⟋1203

Adjust the parameter of the detection model according to the total loss value ⟋1204

In a case where the first loss function converges, determine the detection model as the object detection model ⟋1205

FIG. 13

OBJECT DETECTION METHOD AND DEVICE, AND OBJECT DETECTION MODULE TRAINING METHOD AND DEVICE

CROSS-REFERENCE TO RELATED APPLICATIONS

This application is a national phase entry under 35 USC 371 of International Patent Application No. PCT/CN2023/078250, filed on Feb. 24, 2023, which claims priority to International Patent Application No. PCT/CN2022/078114, filed with the Chinese Patent Office on Feb. 25, 2022, which are incorporated herein by reference in their entirety.

TECHNICAL FIELD

The present disclosure relates to the field of image detection technologies, and in particular, to an object detection method and device, and an object detection model training method.

BACKGROUND

Multi-dataset fusion detection training refers to use multiple datasets labeled with different categories to train a single detector to achieve full-class object detection. Compared with using multiple single detectors in parallel, multi-dataset fusion detection training can realize the simultaneous detection of all categories of targets by a single detector, so that the calculation amount is much smaller, and thus it has high practical application value.

SUMMARY

In an aspect, an object detection method is provided. The method includes: acquiring an image to be detected; and processing the image to be detected by using an object detection model to obtain an object detection result corresponding to a target object to be detected in the image to be detected. The object detection model includes a feature extraction network and an object detection network; the feature extraction network is used to extract features of the image to be detected to obtain image features related to multiple classes of target objects, and the object detection network is used to process the image features to obtain the object detection result. The object detection network includes a class channel layer, multiple object channel layers and multiple box channel layers; an object channel layer is used to output a detection prediction value representing whether a target object exists, and each object channel layer is used to detect at least one of the multiple classes of target objects, and classes of target objects detecting by the multiple object channel layers are different; the class channel layer is used to output a class prediction value corresponding to the multiple classes of target objects; a box channel layer is used to output a coordinate predicted value corresponding to the target object; the object detection result is calculated based on the predicted detection value, the class predicted value and the coordinate predicted value.

In some embodiments, the multiple box channel layers are in one-to-one correspondence with the multiple object channel layers, and each box channel layer has a same class as the target object detected by the corresponding object channel layer; the box channel layer is used to obtain the coordinate prediction value of the target object in a case where the corresponding object channel layer detects the target object.

In some embodiments, the object detection result includes a detection result and a coordinate result; the detection result is obtained by fusion calculation based on the detection prediction value of the object channel layer and the corresponding class prediction value. The box channel layer being used to obtain the coordinate prediction value of the target object in a case where the corresponding object channel layer detects the target object includes: obtaining the coordinate prediction value of the box channel layer in a case where the detection result calculated by the object channel layer corresponding to the box channel layer is greater than or equal to a threshold value; and obtaining no coordinate prediction value of the box channel layer in a case where the detection result calculated by the object channel layer corresponding to the box channel layer is less than the threshold value.

In some embodiments, structures of the class channel layer, the multiple object channel layers and the multiple box channel layers are each a convolution structure, and a size of the convolution kernel of the convolution structure is one by one.

In some embodiments, the feature extraction network includes a backbone network and a neck network. The backbone network is used to determine an image feature of a general class according to the image to be detected, and the neck network is used to determine the image features related to the multiple classes of target objects according to the image feature of the general class.

In another aspect, an object detection model training method is provided. The method includes: acquiring a training set, the training set including multiple training datasets, each training dataset including label data of multiple classes of target objects, and classes of target objects labeled by at least two datasets of the multiple datasets being different; and performing iterative training on a detection model according to the training set to obtain an object detection model. The object detection model includes a feature extraction network and an object detection network; the feature extraction network is used to extract features of the image to be detected to obtain image features related to multiple classes of target objects, and the object detection network is used to process the image features to obtain the object detection result. The object detection network includes a class channel layer, multiple object channel layers and multiple box channel layers; an object channel layer is used to output a detection prediction value representing whether a target object exists, and each object channel layer is used to detect at least one of the multiple classes of target objects, and classes of target objects detecting by the multiple object channel layers are different; the class channel layer is used to output a class prediction value corresponding to the multiple classes of target objects; a box channel layer is used to output a coordinate predicted value corresponding to the target object; the object detection result is calculated based on the predicted detection value, the class predicted value and the coordinate predicted value.

In some embodiments, performing the iterative training on the detection model according to the training set to obtain the object detection model includes: inputting, for each iteration, the training set into the detection model to determine detection results of the multiple classes of target objects; calculating a first loss value according to the detection results of the multiple classes of target objects and a first loss function; adjusting a parameter of the detection model, the first loss function including an object loss function, a box loss function, and a class loss function; and determining, in a case where the first loss function converges, the detection model as the object detection model.

In some embodiments, the object loss function satisfies the following formula:

$$
\begin{cases}
L_{obj+} = \sum_{b=1}^{NP} \sum_{s \in Target(b)} BCELoss(P_{obj}(s, b), GT_{obj}(s)) \\
L_{obj-} = \sum_{b=1}^{NP} 1(L_{obj}(b) \subseteq L_{data}) \times \sum_{p=1}^{H*W} \sum_{a=1}^{Anchor} [1 - Mask(p, a)] \times \\
\qquad\qquad BCELoss(P_{obj}(p, a, b), GT_{obj}(p, a))
\end{cases}
$$

$L_{obj+}$ represents an object loss value of positive samples in the training set; NP represents a total number of the object channel layers; b represents a number of an object channel layer; Target(b) represents an Anchor set of positive samples corresponding to a b-th object channel layer, BCELoss represents a binary cross entropy (BCE) loss function; s represents a number of a positive sample; $P_{obj}(s, b)$ represents an object prediction value corresponding to the b-th object channel layer and Anchor of an s-th positive sample; $GT_{obj}(s)$ represents an object real value corresponding to the Anchor of the s-th positive sample; $L_{obj-}$ represents an object loss value of negative samples in the training set; $L_{obj}(b)$ represents a class subset of a target object corresponding to the b-th object channel layer; 1( . . . ) is an indication function, in a case where an input is True, a value is 1, otherwise the value is 0; $L_{data}$ represents a class set of a target object labeled by current training data; H represents the number of rows of data matrix output by the object channel layer, W represents the number of columns of the data matrix output by the object channel layer; p represents a number of a pixel; Anchor represents all Anchor sets; a represents Anchor of the pixel p; Mask(p, a) represents whether there is a label box at a position corresponding to the pixel p; $P_{obj}(p, a, b)$ represents an object prediction value of an a-th Anchor of the pixel p output by a b-th object channel layer; $GT_{obj}(p, a)$ represents an object real value of the a-th Anchor of the pixel p.

In some embodiments, the box loss function satisfies the following formula:

$$
L_{box} = \sum_{b=1}^{NP} \sum_{s \in Target(b)} [1 - IOU(P_{box}(s, b), GT_{box}(s))]
$$

$L_{box}$ represents a coordinate loss value; NP represents a total number of the object channel layers; b represents a number of an object channel layer, Target(b) represents an Anchor set of positive samples corresponding to a b-th object channel layer; IOU represents an intersection over union (IOU) calculation function; s represents a number of a positive sample; $P_{box}(s, b)$ represents a coordinate prediction value of an s-th positive sample output by the b-th object channel layer; and $GT_{box}(s)$ represents a coordinate real value of the s-th positive sample.

In some embodiments the class loss function satisfies the following formula:

$$
L_{cls} = \sum_{c=1}^{Class} 1[Len(B_{cls}(b)) > 1]
$$

4

-continued $$
\sum_{p=1}^{H*W} \sum_{a=1}^{Anchor} Mask(p, a) \times BCELoss(P_{cls}(p, a, c), GT_{cls}(p, a, c))
$$

$L_{cls}$ represents a class loss value; Class represents a total number of classes of the target objects; 1[ . . . ] is an indication function, in a case where an input is True, a value is 1, otherwise the value is 0; b represents a number of an object channel layer; $B_{cls}(b)$ represents a set of a second class corresponding to the b-th object channel layer; Len $(B_{cls}(b))$ represents a class sub-set of a target object corresponding to the b-th object channel layer; H represents the number of rows of data matrix output by the object channel layer; W represents the number of columns of the data matrix output by the object channel layer; Anchor represents all Anchor sets; Mask(p, a) indicates whether there is a label box at a position corresponding to a pixel p; BCELoss represents a BCE loss function; $P_{cls}(p, a, c)$ represents a class prediction value; $GT_{cls}(p, a, c)$ represents a class real value.

In some embodiments, the method further includes: acquiring a verification set, the verification set including multiple verification datasets in one-to-one correspondence with the multiple training datasets, and each verification dataset including label data of one or more classes of target objects; inputting the multiple verification datasets into the object detection model respectively to obtain accuracy rates of the multiple verification datasets; and summing the accuracy rates of the multiple verification datasets to be as a total accuracy rate of the trained object detection model, or taking the accuracy rates of the multiple verification datasets together as the total accuracy rate of the trained object detection model.

In yet another aspect, an object detection model training method is provided. The method includes: acquiring a training set, the training set including multiple training datasets, each training dataset including label data of multiple classes of target objects, and classes of target objects labeled by at least two datasets of the multiple datasets being different; determining an optimal detection model, the optimal detection model being a detection model with the highest accuracy rate among historical training detection models, and the historical training detection models including detection models each whose parameter is updated after each iteration training; performing iterative training on the detection model according to the training set; and perform pseudo-label labeling on the training set according to the optimal detection model, so as to continue to train the detection model to obtain an object detection model.

In some embodiments, performing the pseudo-label labeling on the training set according to the optimal detection model to obtain the object detection model includes: performing pseudo-label labeling on lacking target objects in each training dataset of the training set according to the optimal detection model to obtain positive sample label data and negative sample label data, the lacking target objects being target objects whose classes are not labeled by the training dataset; determining a positive sample loss value according to the positive sample label data and a positive sample loss function; determining a negative sample loss value according to the negative sample label data and a negative sample loss function; adjusting the parameter of the detection model according to a total loss value, wherein the total loss value is determined according to a first loss value, the positive sample loss value and the negative sample loss value; and determining, in a case where a total loss function converges, the detection model as the object detection model, wherein the total loss function includes a first loss function, the positive sample loss function, and the negative sample loss function.

In some embodiments, performing labeling on the lacking target objects in the training set according to the optimal detection model to obtain positive sample label data and negative sample label data includes: inputting the training set into the optimal detection model to determine a detection score of the optimal detection model for each lacking target object; for each lacking target object, under a condition in which the detection score of the optimal detection model for the lacking target object is greater than or equal to a positive sample score threshold, determining label data corresponding to the lacking target object as the positive sample label data; and for each lacking target object, under a condition in which the detection score of the optimal detection model for the lacking target object is less than or equal to a negative sample score threshold, determining label data corresponding to the lacking target object as the negative sample label data.

In some embodiments, the positive sample score threshold and the negative sample score threshold are determined according to the following steps: acquiring a verification set, the verification set including multiple verification datasets corresponding to the multiple training datasets, each verification dataset including label data of one or more classes of target objects, and an accuracy rate of the detection model being determined according to the verification set; determining a detection score of the optimal detection model for each target object in the verification set; determining the negative sample score threshold according to the detection score of each target object and a preset recall rate; and determining the positive sample score threshold according to the detection score of each target object and a preset precision.

In some embodiments, the method further includes: determining a first weight, a second weight and a third weight; and determining the total loss value according to a product of the first weight and the first loss value, a product of the second weight and the positive sample loss value, and a product of the third weight and the negative sample loss value.

In yet another aspect, an object detection device is provided. The device includes a processor and a communication interface. The communication interface is coupled to the processor, and the processor is used to run computer programs or instructions to implement the object detection method as described in any one of the above embodiments.

In yet another aspect, an object detection device is provided. The device includes a processor and a communication interface. The communication interface is coupled to the processor, and the processor is used to run computer programs or instructions to implement the object detection model training method as described in any one of the above embodiments.

In yet another aspect, a non-transitory computer-readable storage medium is provided. The non-transitory computer-readable storage medium has stored computer program instructions that, when run on a computer (e.g., an object detection device), cause the computer to perform the object detection method as described in any one of the above embodiments.

In yet another aspect, a non-transitory computer-readable storage medium is provided. The non-transitory computer-readable storage medium has stored computer program instructions that, when run on a computer (e.g., an object detection module training device), cause the computer to perform the object detection module training method as described in any one of the above embodiments.

In yet another aspect, a computer program product is provided. The computer program product includes computer program instructions that, when run on a computer (e.g., an object detection module training device), cause the computer to perform the object detection method and object detection model training method according to any of the above embodiments.

In yet another aspect, a computer program is provided. When executed on a computer (e.g., an object detection module training device), the computer program causes the computer to perform the object detection method and object detection model training method as described in any one of the above embodiments.

In yet another aspect, a chip is provided. The chip includes a processor and a communication interface, the communication interface is coupled to the processor, and the processor is used to run computer programs or instructions to implement the object detection method and object detection model training method as described in any one of the above embodiments.

In some embodiments, the chip provided in the present disclosure further includes a memory for storing computer programs or instructions.

It will be noted that all or part of the computer instructions is stored on a computer-readable storage medium. The computer-readable storage medium is packaged together with the processor of the device, or is packaged separately with the processor of the device, which is not limited in the present disclosure.

In yet another aspect, an object detection system is provided. The object detection system includes: an object detection device and an object detection model training device. The detection module training device is used to perform the object detection method as described in any of the above embodiments, and the object detection model training device is used to perform the object detection model training method described in any one of the above embodiments.

In the present disclosure, the names of the object detection device and object detection model training device do not limit devices or functional modules themselves. In actual implementation, these devices or functional modules appear with other names, as long as the functions of each device or functional module are similar to those in the present disclosure, which will fall within the scope of the claims of the present disclosure and the equivalent technologies thereof.

BRIEF DESCRIPTION OF THE DRAWINGS

In order to describe technical solutions in the present disclosure more clearly, the accompanying drawings to be used in some embodiments of the present disclosure will be introduced briefly. Obviously, the accompanying drawings to be described below are merely drawings of some embodiments of the present disclosure, and a person of ordinary skill in the art can obtain other drawings according to those drawings. In addition, the accompanying drawings in the following description may be regarded as schematic diagrams, but are not limitations on actual sizes of products, actual processes of methods and actual timings of signals involved in the embodiments of the present disclosure.

FIG. 9 is a flow diagram of yet another object detection model training method, in accordance with some embodiments;

FIG. 10 is a flow diagram of yet another object detection model training method, in accordance with some embodiments;

FIG. 13 is a flow diagram of yet another object detection model training method, in accordance with some embodiments;

DETAILED DESCRIPTION

Figure 1:
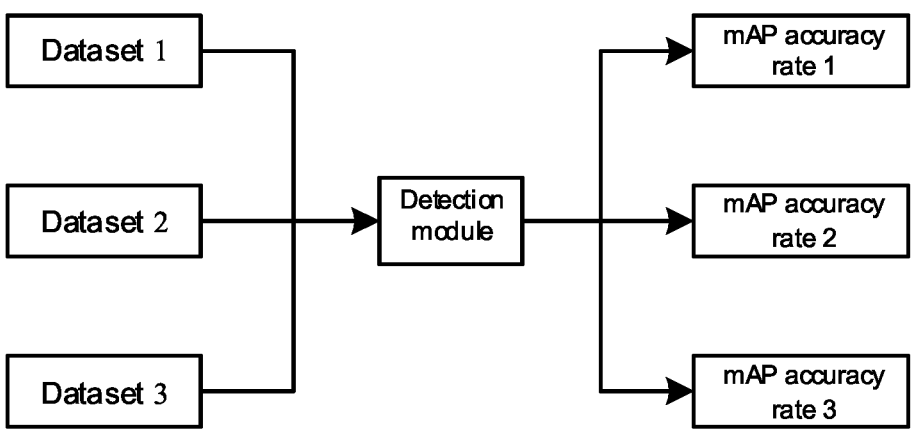
FIG. 1 is a flow diagram of a multi-dataset fusion detection, in accordance with some embodiments.

The technical solutions in some embodiments of the present disclosure will be described clearly and completely with reference to the accompanying drawings. Obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the feature defined with "first" or "second" may explicitly or implicitly include one or more of the features. In the description of the embodiments of the present disclosure, the term "a plurality of" or "the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. As another example, the term "connected" may be used in the description of some embodiments to indicate that two or more components are in direct physical or electrical contact. However, the term "coupled" or "communicatively coupled" may also mean that two or more elements are not in direct contact with each other, but still cooperate or interact with each other. The embodiments disclosed herein are not necessarily limited to the context herein.

The phrase "at least one of A, B, and C" has the same meaning as the phrase "at least one of A, B, or C", and they both include the following combinations of A, B, and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The use of the phase "applicable to" or "configured to" herein means an open and inclusive language, which does not exclude devices that are applicable to or configured to perform additional tasks or steps.

Additionally, the use of the phase "based on" is meant to be open and inclusive, since a process, step, calculation or other action that is "based on" one or more of the stated conditions or values may, in practice, be based on additional conditions or value beyond those stated.

The term such as "about", "substantially", or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

The terms involved in the embodiments of the present disclosure are explained below to facilitate understanding for the reader.

(1) Object Detection

Object detection refers to the detection of a target object of a set class, such as human face, human body, vehicle, or building object, in a given image. Generally, the detection result of object detection gives a region detection box, region coordinates and a class of the target object. The region detection box is the circumscribed rectangular box of the detected target object in the detection result output by the object detection.

(2) Multi-Dataset Fusion Detection

Multi-dataset fusion detection refers to training of a single detection model based on multiple datasets labeled with different classes to achieve full-class object detection. The datasets include image data and labeled data, the image data is used to represent an image of the target object, and correspondingly, the labeled data is data for labeling the target object existing in the image data.

As shown in FIG. 1, multi-dataset fusion detection trains the detection module on multiple data sets (the figure is illustrated by taking an example in which the number of datasets is three), multiple datasets are input into the detection model to train, and after the training is completed, a validation set of each dataset is used to calculate the mean average precision (mAP) of the detection module.

However, since the label data of a dataset is only for one class of target objects, and the class of target object labeled by each dataset is different, for some objects in the dataset, there will be situations of lacking of labeling for some objects by the dataset. The existence of such situations will seriously affect the training of the fusion detection module.

(3) Neural Network

Neural networks (NNs) also referred to be as artificial neural networks (ANNs), which are mathematical model algorithm that imitate the behavior characteristics of animal neural networks to perform distributed parallel information processing. Neural networks include deep learning networks, such as convolutional neural networks (CNN) and long short-term memory (LSTM).

In the present disclosure, You Only Look Once Version 5 (Yolov5) algorithm used for detector training is also a type of neural networks.

(4) Loss Function

Loss function is a function that maps a random event or related random variables to non-negative real numbers to represent the "risk" or "loss" of the random event. In applications, the loss function is generally associated with optimization problems as learning criteria, i.e., finding and evaluating a model by minimizing the loss function. For example, the loss function is used for parameter estimation of the model in statistics and machine learning.

In the embodiments of the present disclosure, the loss function is used to evaluate the accuracy of the detection model in detecting the target object. In a case where the loss function of the detection result output by the detection model satisfies a certain preset condition, it is determined that the detection model has been trained, and the trained detection model is determined as the final detection model.

Generally, in the traditional single detection model, only one target channel is set, that is, one object channel is responsible for detecting all classes of target objects. However, since the current dataset generally only labels one class, and the classes labeled by different datasets are not the same, for some objects in the dataset, there will be a situation of lacking of labeling for some objects in the dataset. In view of such situations, since there is only one object channel, the traditional single detection model may lead to a consequence of erroneous interventions by labeled data in the datasets for other classes of objects after the unlabeled objects in the datasets are detected, which may seriously affect the training accuracy of the detection module. However, if the lacking objects in the existing datasets are manually relabeled, the workload of labeling will be very large, and the labor cost will be too high, so that it is difficult to apply on a large scale.

In view of the above defects in the current solution, some embodiments of the present disclosure provide an object detection method and an object detection model training method. In a nutshell, during the model training process of the embodiments of the present disclosure, multiple object channel layers are provided in the detection model to detect target objects by classes. Thus, for target objects of a certain class, after the target objects of this class is detected in the object channel layer of the corresponding class, if the target object of this class is not labeled by the current dataset, when training the detection model according to the current dataset, the output result of the object channel layer corresponding to the target object of this class will not be substituted into the subsequent training process. In this way, it is possible to avoid the problem, produced in the traditional single detection model, of erroneous interventions by labeled data in the dataset for other classes of objects after the unlabeled objects in the dataset are detected, thereby improving the training accuracy of the detection model.

Moreover, during the model training process in the embodiments of the present disclosure, the optimal detection model with the highest historical accuracy may be determined in each iterative training of detection model, and the training process is pseudo-labeled by the optimal detection model. In this way, the pseudo-label labeled data and the labeled data of the real training set are fused to train the detection model, which may improve the detection recall rate of the object detection model in cross-scenario, so as to achieve a better training effect than that of the traditional single detection model training.

Therefore, the object detection model trained by the above training process is able to detect target objects by classes in a specific target detection application, and the detection accuracy is high, which may achieve a good detection effect.

Technical solutions in some embodiments of the present disclosure will be described clearly below with reference to the accompanying drawings.

Figure 2:
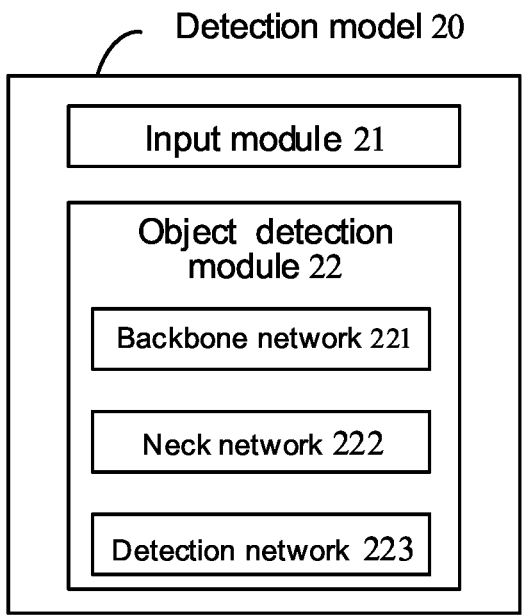
FIG. 2 is an architecture diagram of a detection model, in accordance with some embodiments.

FIG. 2 is an architecture diagram of a detection model 20 provided in accordance with some embodiments; the detection model 20 is a single detection model, and uses the Yolov5 algorithm as the basic architecture. As shown in FIG. 2, the detection model 20 includes an input module 21 and an object detection module 22. The input module 21 is used to input a dataset into the detection model 20. Data transmission can be performed between the input module 21 and the object detection module 22.

The object detection module 22 is used to process the dataset to obtain the training detection result of the target object. As shown in FIG. 2, the object detection module 22 includes a backbone network 221, a neck network 222 and a detection network 223.

The backbone network 221 is used to perform an extraction operation on an image data in the dataset, so as to obtain a general image feature and transmit the general image feature to the neck network 222. Correspondingly, the neck network 222 receives the general image feature sent by the backbone network 221. It will be understood that the general image feature is an image feature of objects of a general class acquired after the backbone network 221 extracts the original image data during the preliminary image extraction in the field of image detection. It will be noted that how the backbone network 221 acquires the general image feature will not be described in detail here. For example, the architecture of the backbone network 221 may adopt CSP-Darkner.

The neck network 222 is used to extract an image feature that are strongly correlated with the class of the target object from the general image features, and send the strongly correlated image feature to the detection network 223. Accordingly, the detection network 223 receives the strongly correlated image feature sent by the neck network 222. It will be understood that the strongly correlated image feature is an image feature of an obtained object whose class similar to the class of the target object after the extraction operation is performed on the general image features by the neck network 222.

It will be understood that the class of the target object here is the detection class set by the detection model 20. It will be noted that how the neck network 222 acquires the image feature that is strongly correlated with the class of the target object will not be described in detail here. For example, the architecture of the neck network 222 may adopt path aggregation network (PANet).

Figure 3:
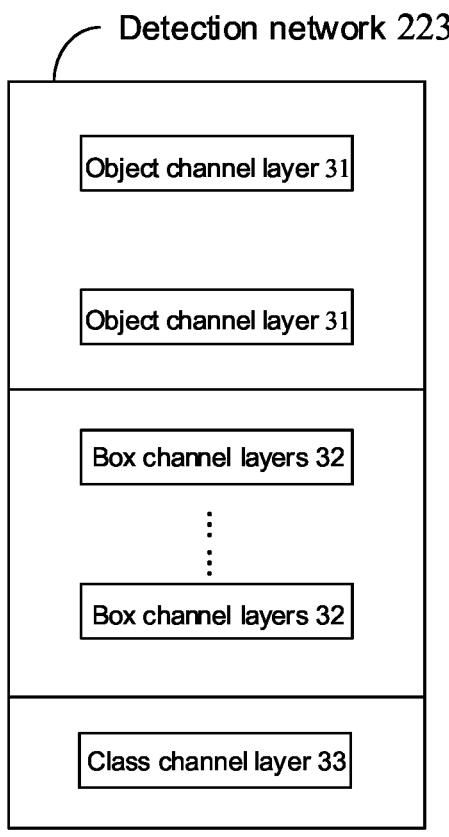
FIG. 3 is an architecture diagram of a detection model, in accordance with some embodiments.

The detection network 223 is used to calculate the final object detection result according to the strongly correlated image feature. The object detection result includes a region detection frame, region coordinates and class of the target object. Optionally, as shown in FIG. 3, the detection network 223 is provided with three kinds of data output channel layers therein, which are an object channel layer 31, a box channel layer 32, and a class channel layer 33, respectively. There are multiple object channel layers 31 and multiple box channel layers 32, and one class channel layer 33.

The object channel layer 31 is used to determine whether there is a target object in a corresponding position in the strongly correlated image feature. If it is determined that there is a target object, the object channel layer 31 will output a region detection frame of the target object at the corresponding position.

Accordingly, the box channel layer 32 is used to calculate, in a case where the object channel layer 31 determines that there is a target object, the specific coordinates of the target object, so as to perform fine adjustment on the region detection frame of the target object, so that the position of the region detection frame is accurate.

Accordingly, the class channel layer 33 is used to identify the class of the target object.

In a possible implementation, the structures of the object channel layer 31, the box channel layer 32, and the class channel layer 33 are each a convolution structure, and a size of the convolution kernel of the convolution structure is one by one.

The architecture of the detection model provided according to some embodiments has been introduced above.

Figure 4:
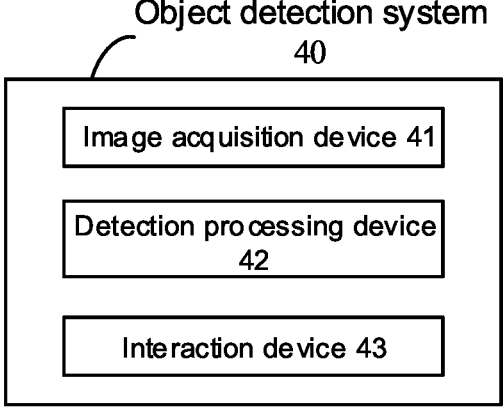
FIG. 4 is an architecture diagram of an object detection system, in accordance with some embodiments.

FIG. 4 is an architecture diagram of an object detection system 40 provided according to some embodiments. The object detection system 40 includes an image acquisition device 41, a detection processing device 42, and an interaction device 43.

The image acquisition device is used to: acquire an image to be detected, and send the image to be detected to the detection processing device 42.

Optionally, the image acquisition device 41 may be implemented as a surveillance camera, a camera, or other equipment capable of image acquisition. It will be understood that the image acquisition device 41 may be arranged at the entrance and exit of a region to be detected, or at a certain vertical height in the region to be detected, so as to acquire an image to be detected of a detection object.

The detection processing device 42 is used to, after receiving the image to be detected, process the image to be detected by using an object detection model, so as to obtain an object detection result corresponding to the target object to be detected in the image to be detected. It will be noted that, as for the process that the detection processing device 42 processes the image to be detected by using the object detection model to obtain the object detection result corresponding to the target object to be detected in the image to be detected, reference will be made to the description of the step 501 to the step 503 below, which will not be repeated here.

The detection processing device 42 sends the object detection result to the interaction device 43 after obtaining the object detection result corresponding to the target object to be detected in the image to be detected.

The interaction device 43 is used to realize the output of the object detection result and the human-computer interaction with the staff.

Optionally, the interaction device 43 may include a display terminal and a human-computer interaction device. The display terminal may be realized as a display or other devices with visual display function, and the human-computer interaction device may be realized as a touch screen, keyboard and mouse, or other devices with human interaction function.

It will be pointed out that in the object detection method provided in the embodiments of the present disclosure, the execution subject is the object detection system; in the object detection model training method provided in the embodiments of the present disclosure, the execution subject is the object detection model training device. The object detection system and the object detection model training device may be servers respectively, which includes:

a processor; the processor may be a general-purpose central processing unit (CPU), a microprocessor, an application specific integrated circuit (ASIC), or one or more integrated circuits for controlling execution of programs of solutions of the embodiments of the present disclosure;

a transceiver; the transceiver may be a device that uses any transceiver to communicate with other devices or communication networks, such as Ethernet, radio access network (RAN), or wireless local area networks (WLAN); and a memory; the memory may be, but is not limited to, a read-only memory (ROM) or a static storage device of any other type that capable of storing static information and instructions, a random access memory (RAM) or a dynamic storage device of any other type that capable of storing information and instructions, or an electrically erasable programmable read-only memory (EEPROM), a compact disc read-only memory (CD-ROM) or any other disc, a compact disc (including a compact disc, a laser disc, an optical disc, a digital general-purpose disc, or a Blu-ray disc), a magnetic disk storage medium or any other magnetic disk storage device, or any other medium that can be used to carry or store desired program codes with instructions or data and can be stored by a computer. The memory may exist independently and be connected to the processor through a communication line. The memory may also be integrated with the processor.

The object detection system and the object detection model training device in the embodiments of the present disclosure may also be respectively a part of the system coupled to the server, such as a chip system in the server.

It will be noted that the various embodiments of the present disclosure may refer to each other, for example, the same or similar steps, method embodiments, system embodiments and device embodiments may refer to each other without limitation.

Figure 5:
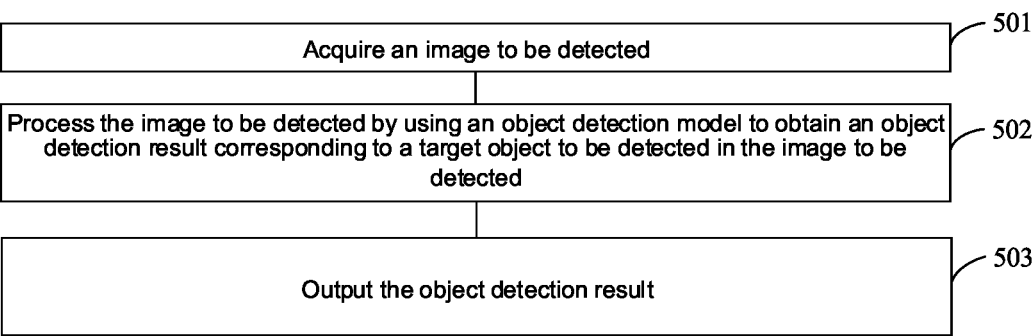
FIG. 5 is a flow diagram of an object detection method, in accordance with some embodiments.

As shown in FIG. 5, FIG. 5 is an object detection method in accordance with some embodiments of the present disclosure, and the method includes the following steps 501 and 503.

In step 501, the object detection system acquires an image to be detected.

The image to be detected is image data that may include a target object to be detected.

In a possible implementation, step 501 is performed by the image acquisition device included in the object detection system as described above, so as to enable the object detection system to acquire the image to be detected.

In S502, the object detection system processes the image to be detected by using an object detection model to obtain an object detection result corresponding to the target object to be detected in the image to be detected.

The object detection model includes a feature extraction network and an object detection network. The feature extraction network and object detection network will be respectively described below.

(1) The feature extraction network is used to extract features of the image to be detected to obtain image features related to multiple classes of target objects.

It will be pointed out that the feature extraction network here is constructed based on the backbone network 221 and the neck network 222 in the detection model 20 that are described above.

That is, the feature extraction network includes a backbone network and a neck network. The backbone network is used to determine an image feature of a general class according to the image to be detected, and the neck network is used to determine the image features related to the multiple classes of target objects according to the image feature of the general class.

(2) The object detection network is used to process the image features to obtain the object detection results.

It will be noted that the target detection network here is constructed based on the detection network 223 in the detection model 20 described above.

That is, the object detection network includes a class channel layer, multiple object channel layers and multiple box channel layers. The structures of the class channel layer, the multiple object channel layers and the multiple box channel layers are each a convolution structure, and the size of the convolution kernel of the convolution structure is one by one.

The object channel layer is used to output a detection prediction value representing whether there is a target object, each object channel layer is used to detect at least one of the multiple classes of target objects, and the multiple object channel layers are used to detect different classes of target objects. The class channel layer is used to output class prediction values corresponding to the multiple classes of target objects, and the box channel layer is used to output a coordinate prediction value corresponding to the detected target object.

It will be noted that the multiple box channel layers and the multiple object channel layers are in one-to-one correspondence. That is to say, each box channel layer has a same class as the target object detected by the corresponding object channel layer, and one or more target objects are detected. In a case where the corresponding object channel layer detects that the target object exists, the box channel layer is used to obtain the coordinate prediction value of the target object.

It will be understood that, in these embodiments, the multiple box channel layers and the multiple object channel layers that are in one-to-one correspondence are provided, and each box channel layer has a same class as the target object detected by the corresponding object channel layer. Therefore, the prediction between different target objects does not affect each other, so that the detection of multiple classes of target objects is achieved. For a case that the object channel layer detects a target object, the coordinate prediction value of the corresponding box channel layer is obtained; for another case that the object channel layer does not detect a target object, the coordinate prediction value of the corresponding box channel layer is discarded. In this way, by providing the object channel layers and the box channel layers that are in one-to-one correspondence, it is possible to efficiently detect the positions of different classes of target objects at the same time, which greatly saves computing power and speeds up detection.

In a possible implementation, during the training process of the object detection model, multiple object channel layers are provided in the detection model, and these object channel layers detect target objects by classes. Thus, for target objects of a certain class, after the target objects of this class is detected in the object channel layer of the corresponding class, if the target object of this class is not labeled by the current dataset, when training the detection model according to the current dataset, the output result of the object channel layer corresponding to the target object of this class will not be substituted into the subsequent training process. In this way, it is possible to avoid the problem of erroneous interventions by labeled data in the dataset for other classes of objects after the unlabeled objects in the dataset are detected, thereby improving the training accuracy of the detection model.

Optionally, during the training process of the object detection model, determining whether the target object is detected by the object channel layer may be achieved in the following manner performing fusion calculation on the detection prediction value output by each object channel layer and the class prediction value corresponding to the class detected by the object channel layer in the class channel layer to obtain the detection result; and comparing the detection result and a threshold to determine whether the target object of the class detected by the object channel layer exists. That is to say, by performing the fusion calculation on the detection prediction value output by each object channel layer and the class prediction value corresponding to the class detected by the object channel layer in the class channel layer, it is possible to combine the information of two dimensions of position and class to predict whether the target object is detected, thereby making the prediction result of whether the target object exists accurate.

In another possible implementation, during the model training process in the embodiments of the present disclosure, the optimal detection model with the highest historical accuracy may be determined in each iterative training of detection model, and a training set is labeled with pseudo-label by using the optimal detection model. Thus, fusion training is performed on the detection model by combining the label data obtained after the training set is labeled with pseudo-labels and label data of a real training set, it is possible to apply the pseudo-label labeling to the training process of the object detection model, which may improve the detection recall rate of the object detection model in cross-scenario, and achieves a good training effect.

It will be understood that the above two possible object detection model training methods are able to be applied in combination to train the object detection method in these embodiments while applied separately to train the object detection method in these embodiments. That is to say, the object detection model in the object detection method provided in these embodiments is trained by one of the above two possible object detection model training methods to be obtained, or the object detection model is trained by combining the above two possible object detection model training methods to be obtained.

The feature extraction network and object detection network have been described above.

The object detection result will be described below.

It will be understood that the object detection result is calculated based on the detection prediction value, class prediction value and coordinate prediction value.

For example, the object detection result includes a detection result and a coordinate result. The detection result is obtained by fusion calculation based on the detection prediction value of the object channel layer and the corresponding class prediction value. It is implemented in the following manner. The detection prediction value output by each object channel layer is multiplied by the class prediction value of the corresponding class to obtain the corresponding detection result; in a case where the detection result is higher than the threshold value, it is considered that the object channel layer detects a target object of a detection class, and then the coordinate prediction value output by the box channel layer is obtained to be as the coordinate result; in a case where the detection result is lower than the threshold value, it is considered that the object channel layer does not detect a target object of a detection class, and then the coordinate prediction value output by the box channel layer is discarded directly.

Further, in a case where the box channel layer is used to determine the coordinate prediction value of the target object, the following rules are followed. In a case where the detection result calculated by the object channel layer corresponding to the box channel layer is greater than or equal to the threshold value, the coordinate prediction value of the box channel layer is obtained; in a case where the detection result calculated by the object channel layer corresponding to the box channel layer is less than the threshold value, the coordinate prediction value of the box channel layer is not obtained.

In a possible implementation, the step 502 is performed by the detection processing device included in the object detection system as described above, so that the image to be detected is processed by the object detection system by using the object detection model to obtain the object detection result corresponding to the target object to be detected in the image to be detected.

In step 503, the object detection system outputs the object detection result.

Optionally, the object detection system displays the object detection result to the staff in a visualized manner. For example, the object detection system displays the object detection result on the display screen in the form of the region detection box, region coordinates and class of the target object, so that the staff is informed of the detection result of the object detection system on the detection target.

In a possible implementation, step 503 is specifically performed by the interaction device included in the object detection system as described above, so that the object detection result is output by the object detection system.

Based on the above technical solution, the object detection system provided by the embodiments of the present disclosure is able to detect the target object in the image to be detected. Furthermore, since multiple object channel layers are provided in the object detection model in the object detection system, and these object channel layers detect the target objects by classes, the detection accuracy of the object detection model is relatively high. Therefore, the object detection system provided in the embodiments of the present disclosure achieves a good detection effect for the target object.

Figure 6:
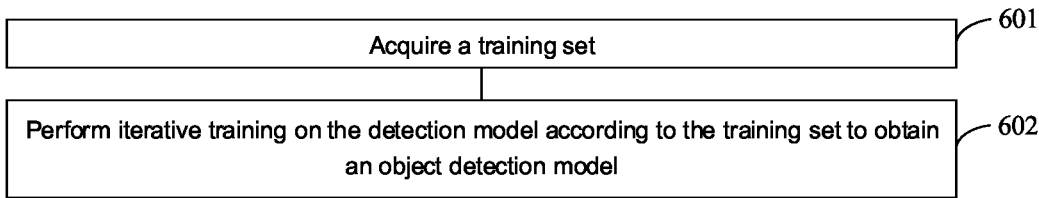
FIG. 6 is a flow diagram of an object detection model training method, in accordance with some embodiments.

As shown in FIG. 6, FIG. 6 is an object detection model training method in accordance with some embodiments, and the method includes the following steps 601 to 602.

In step 601, a training set is acquired by the object detection model training device.

The training set includes label data of multiple classes of target objects. For example, the training set includes multiple training datasets, and each training dataset includes image data and data labeling one or more classes of target objects. For example, the training set includes three datasets, and the classes of the target objects respectively labeled by the three datasets are people, motor vehicle and non-motor vehicle, respectively. For another example, the training set includes two datasets, a class of a target object labeled by one dataset is person, and classes of target objects labeled by the other dataset are motor vehicle and non-motor vehicle, respectively.

It will be noted that in the training set, the number of datasets and the number of classes of target objects is not equal. For example, multiple datasets included in the training set include datasets labeling target objects of the same class. Here, for the target objects of the same class, the purpose of obtaining multiple datasets is to expand the collection scope of sample data, so as to improve the accuracy rate of the final trained detection model. For example, in the training set, the classes of the target objects respectively labeled by multiple datasets are all people, and the difference of these datasets is that some datasets are data collected during the day, and some datasets are data collected at night; or some datasets are data collected at intersections with dense crowds, and some datasets are data collected at intersections with sparse crowds.

In step 602, iterative training is performed on the detection model by the object detection model training device according to the training set to obtain the object detection model.

The object detection model is a detection model that meets a preset requirement after iterative training and is able to be used in practical applications. For example, meeting the preset requirement means that the loss function of the detection result of the detection model reaches convergence, or the accuracy rate of the detection result of the detection model reaches a preset required percentage, and the accuracy rate here adopts the mAP value.

Optionally, the detection model is constructed based on the Yolov5 architecture detection model shown in FIG. 2. Accordingly, the object detection model obtained after iterative training is also constructed based on the Yolov5 architecture detection model shown in FIG. 2.

It will be pointed out that the object detection model after iterative training based on the training set here is the object detection model in the aforementioned step 502. For the specific description of the object detection model, reference is made to the foregoing step 502, which will not be repeated here in these embodiments.

It will be noted that, during the iterative training process, the class of the target object detected by the object channel layer is the same as or different from the classes of the target objects labeled by all the datasets included in the training set.

For example, in conjunction with the examples in the aforementioned step 601, the classes of the target objects labeled by all the datasets include people, motor vehicle, and non-motor vehicle. Thus, the classes of target objects detected by the object channel layer include people, motor vehicle, and non-motor vehicle.

Alternatively, the classes of the target object detected by the object channel layer includes sub-classes of the classes of the target object labeled by the datasets; for example, the classes of the target objects detected by the object channel layer include people, bus, car, bicycle, and tricycle. Bus and car are the sub-classes of motor vehicle in a first class, and bicycle and tricycle are the sub-classes of non-motor vehicle in the first class.

In a possible implementation, performing the iterative training on the detection model by the object detection model training device according to the training set includes: after the detection results of multiple classes of target objects are determined by the detection model, calculating a first loss value according to both the detection results of the multiple classes of target objects and a first loss function; and adjusting parameter of the detection model according to the first loss value. It will be noted that, for the detailed process of the iterative training of the detection model by the object detection model training device according to the training set, reference is made to the following steps 701 to 704, which will not be repeated here.

For example, with reference to the examples in the step 601, it is assumed that the class of the object labeled by the current data set for training is people. For a target object whose class is motor vehicle, if the object channel layer used to detect motor vehicle in the multiple object channel layers detects the existence of a motor vehicle in the image data corresponding to the dataset, the object detection model training device will not substitute the detection result output by the object channel layer whose detection class is motor vehicle into the subsequent training process because the object labeled by the current dataset is person. Similarly, the detection results output by object channel layers whose classes are other classes except people will not be substituted into the subsequent training process, and only the detection result output by the object channel layer whose class is people will be substituted into the subsequent training process.

Therefore, for the dataset whose labeling class is people, the label data only have an impact on the detection results output by the object channel layer whose detection class is people, and the same is true for datasets whose labeling classes are other classes. In this way, during the training process, it is avoided that a certain class of label data has a negative impact on the detection results of other classes of target objects, thereby improving the accuracy of object detection model training.

Based on the above technical solutions, in the embodiments of the present disclosure, multiple object channel layers are provided in the detection model, and these object channel layers detect target objects by classes. Thus, for target objects of a certain class, after the target objects of this class is detected in the object channel layer of the corresponding class, if the target object of this class is not labeled by the current dataset, when training the detection model according to the current dataset, the output result of the object channel layer corresponding to the target object of this class will not be substituted into the subsequent training process. In this way, it is possible to avoid the problem of erroneous interventions by labeled data in the dataset for other classes of objects after the unlabeled objects in the dataset are detected, thereby improving the training accuracy of the detection model.

In combination with the above step 602, the process of the detection model being trained by the object detection module training device according to training set to obtain the object detection model will be specifically introduced below.

Figure 7:
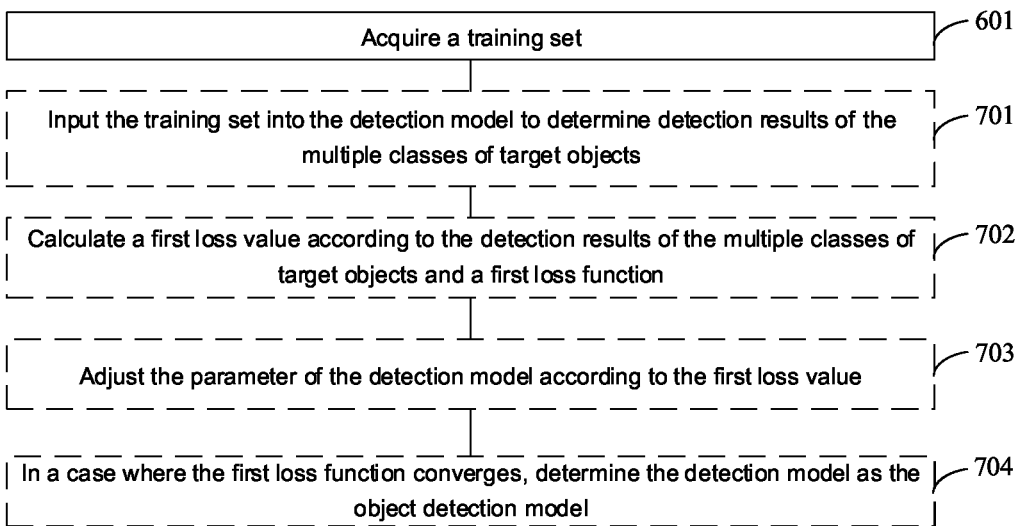
FIG. 7 is a flow diagram of another object detection model training method, in accordance with some embodiments.

As a possible embodiment of the present disclosure, referring to FIG. 6, as shown in FIG. 7, the above step 602 includes the following steps 701 to 704.

In step 701, the training set is input into the detection model by the object detection model training device to determine the detection results of the multiple classes of target objects.

For example, in combination with the content in the step 602, since the detection model is constructed based on the Yolov5 architecture detection model shown in FIG. 2, the object detection model training device input the training set into the detection model by using the input module 21 in the detection model 20.

Optionally, the detection results of the multiple classes of target objects are each obtained from the detection prediction value, class prediction value, and coordinate prediction value. That is, the detection prediction value, class prediction value and coordinate prediction value are respectively determined by the class channel layer, object channel layer and box channel layer of the detection model.

In step 702, the first loss value is calculated by the object detection model training device according to the detection results of the multiple classes of target objects and the first loss function.

Optionally, the first loss function includes an object loss function, a box loss function, and a class loss function.

In some embodiments, the first loss function is obtained by adding the object loss function, the box loss function, and the class loss function.

It will be noted that, for the specific process of calculating the first loss value by the object detection model training device according to both the detection results of the multiple classes of target objects and the first loss function as well as the formulas of the object loss function, box loss function, and class loss function, reference is made to the following steps 901 to 904, which will not be repeated here.

In step 703, the parameter of the detection model is adjusted by the object detection model training device according to the first loss value.

For example, after the detection model performs one iterative detection, the object detection model training device determines whether the first loss function of the detection result converges.

If the first loss function converges, the object detection model training device determines that the training for the detection model is completed, and determines the current detection model as the object detection model.

If the first loss function does not converge, the object detection model training device updates the parameter of the detection model to perform the next iterative detection. If the first loss function of the detection model converges in the next iteration, the object detection model training device determines the current detection model as the object detection model. If the first loss function of the detection model does not converge in the next iteration, the object detection model training device continues to update the parameter of the detection model until the first loss function of the detection model converges.

In step 704, in the case where the first loss function converges, the detection model is determined as the object detection model by the object detection model training device.

It will be understood that the object detection model is a detection model that is able to be used in practical applications.

Based on the above technical solution, in the embodiments of the present disclosure, it is possible to performs multiple trainings on the detection model according to the first loss function, during the training process, by continuously updating the parameter of the detection model, the detection result output each time is closer to the real result reflected by the label data for labeling the target object in the training set. In a case where the value of the first loss function gradually decreases until the value of the first loss function no longer decreases, i.e., the loss function converges, the current detection model is determined as the object detection model. In this way, the detection model is able to complete the detection of the target object in subsequent practical applications well.

In conjunction with step 701, the process of inputting the training set into the detection model by the object detection model training device to determine the detection results of the multiple classes of target objects will be described in detail below.

Figure 8:
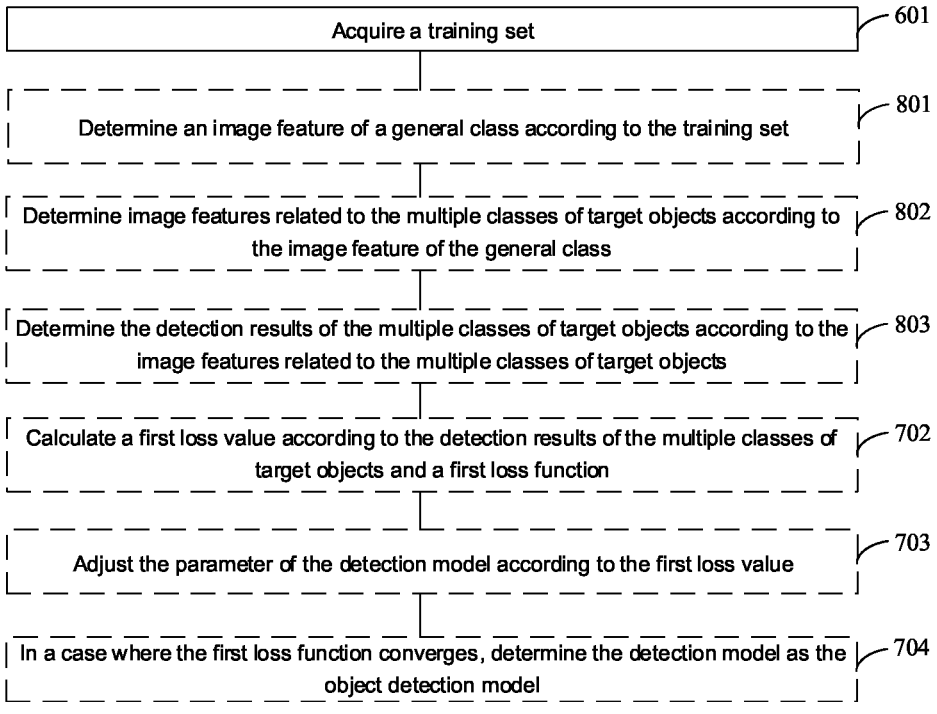
FIG. 8 is a flow diagram of yet another object detection model training method, in accordance with some embodiments.

As a possible embodiment of the present disclosure, with reference to FIGS. 5 and 7, as shown in FIG. 8, the step 701 includes the following steps 801 to 803.

In step 801, an image feature of a general class is determined by the object detection model training device according to the training set.

In a possible implementation, the object detection model training device determines the image feature of general class through a backbone network.

For example, the detection model may include the backbone network, and the backbone network may be the backbone network as shown in FIG. 2. The object detection model training device extracts the image feature of general class in the image data included in the training set through the backbone network. Here, it will be noted that, the method for extracting the image feature of general class in the image data included in the training set through the backbone network is described will not be repeated in the present disclosure.

It will be understood that, after the image feature of a general class is determined by the backbone network, since the general class includes the class of the target object, a neck network is able to extract image features of multiple classes of target objects according to the image feature of general class in the subsequent step 802.

In step 802, the image features related to the multiple classes of target objects are determined by the object detection model training device according to the image feature of the general class.

In a possible implementation, the object detection model training device determines the image features related to the multiple classes of target objects through the neck network.

For example, the detection model includes a neck network, and the neck network is the neck network as shown in FIG. 2. The object detection model training device extracts the image feature of the general class through the neck network to determine the image features related to the multiple classes of target objects. Here, it will be noted that, a method for extracting the image feature of the general class through the neck network to determine the image features related to the multiple classes of target objects will be not repeated in the present disclosure.

In step 803, the detection results of the multiple classes of target objects are determined by the object detection model training device according to the image features related to the multiple classes of target objects.

In a possible implementation, the object detection model training device determines the detection results of the multiple classes of target objects through a detection network.

For example, the detection model includes a detection network, and the detection network is the detection network as shown in FIG. 2. The object detection model training device determines the detection results of the multiple classes of target objects through the detection network according to the image features related to the multiple classes of target objects.

Optionally, the detection network is provided with multiple object channel layers, multiple box channel layers and multiple class channel layers. Functions of these three channel layers will be described below.

(1) Object Channel Layer

An object channel layer is used to detect whether at least one class of target object among multiple classes of target objects exists in the current detection region. For example, the result output by the object channel layer here is "existence" and "inexistence", e.g., in the form of a detection prediction value of yes or no.

Optionally, the object detection model training device presets a determine threshold, and then the object channel layer determines the probability value of the target object existing in the current detection region. In a case where the probability determined by the object channel layer is greater than or equal to the determine threshold, the object detection model training device determines that a target object exists in the current detection region, and the output result of the object channel layer is "existence"; similarly, if the probability determined by the object channel layer is less than the determine threshold, the object detection model training device determines no target object exists in the current detection region, and the output result of the object channel layer is "inexistence".

For example, for a certain class of target object, the object channel layer determines that the probability of the existence of this class of target object in the current detection region is 0.98. It is assumed that the determine threshold preset by the object detection model training device is 0.9, since 0.98 is greater than 0.9, the object detection model training device determines that a target object exists in the current detection region.

In a possible implementation, the object channel layer is the object channel layer as shown in FIG. 3.

(2) Box Channel Layer

In a case where the object channel layer determines that a target object exists in the current detection region, the box channel layer is used to determine and output the coordinates of the region where the target object exists, e.g., in the form of the coordinate prediction value of (X, Y).

In a possible implementation, the box channel layer is the box channel layer as shown in FIG. 3.

It will be noted that, for each detection region, in a case where the object detection model training device determines that a target object exists in the detection region according to the object channel layer, the box channel layer will output the coordinates of the detection region. Therefore, in the embodiments of the present disclosure, the number of object channel layers is changed from original number of one to multiple (assuming that there are N object channel layers), the number of box channel layers will become multiple times of the original number (that is, the number of the box channel layers will become N times the original number) accordingly.

(3) Class Channel Layer

In a case where the object channel layer determines that a target object exists in the current detection region, the class channel layer is used to determine and output the class of the region where the target object exists, e.g., in the form of a detection prediction value of people or car.

In a possible implementation, the class channel layer may be the class channel layer as shown in FIG. 3.

It will be noted that the number of class channel layers is the same as the number of classes of target objects labeled in the training set.

For example, the output results of the object channel layer, the box channel layer and the class channel layer is in the form of a mathematical matrix. The current image region detected by the object channel layer is a pixel in the image features related to the multiple classes of target objects.

In a possible implementation, the object detection model training device combines the output results of the multiple object channel layers, multiple box channel layers, and multiple class channel layers to determine the detection results of the multiple classes of target objects.

Based on the above-mentioned technical solutions, in the embodiments of the present disclosure, the detection results of the multiple classes of target objects are determined according to the image data included in the training set through the backbone network, neck network, and detection network provided in the detection model, as well as multiple object channel layers, box channel layers, and class channel layers provided in the detection network, which facilitates the subsequent object detection model training process.

In conjunction with step 702, the process of determining the first loss function by the object detection model training device according to the training set and the detection results of the multiple classes of target objects will be described in detail below.

As a possible embodiment of the present disclosure, with reference to FIG. 7, as shown in FIG. 9, the step 702 includes the following steps 901 to 904.

In step 901, an object loss value is determined by the object detection model training device according to the output results of the multiple object channel layers, the label data of the multiple classes of target objects, and the object loss function.

The object loss value includes an object loss value of positive samples and an object loss value of negative samples.

In a possible implementation, the object loss function satisfies the following Formula 1:

$$\begin{cases} L_{obj+} = \sum_{b=1}^{NP} \sum_{s \in Target(b)} BCELoss(P_{obj}(s, b), GT_{obx}(s)) & \text{Formula 1} \\ L_{obj-} = \sum_{b=1}^{NP} 1(L_{obj}(b) \subseteq L_{data}) \times \\ \sum_{p=1}^{H*W} \sum_{a=1}^{Anchor} [1 - Mask(p, a)] \times \\ BCELoss(P_{obj}(p, a, b), GT_{obj}(p, a)) \end{cases}$$

$L_{obj+}$ represents an object loss value of positive samples in the training set, NP represents a total number of the object channel layers, b represents a number of the object channel layer, Target(b) represents an Anchor set of positive samples corresponding to the b-th object channel layer, BCELoss represents a binary cross entropy (BCE) loss function, s represents a number of the positive sample, $P_{obj}(s, b)$ represents an object prediction value corresponding to the b-th object channel layer and Anchor of the s-th positive sample. $GT_{obj}(s)$ represents an object real value corresponding to the Anchor of the s-th positive sample; $L_{obj-}$ represents an object loss value of the negative samples in the training set; $L_{obj}(b)$ represents a second class subset corresponding to the b-th object channel layer; 1( . . . ) is an indication function, in a case where an input is True, the value is 1, otherwise the value is 0; $L_{data}$ represents a first class subset labeled by the current training data; H represents the number of rows of data matrix of the object channel layer; W represents the number of columns of the data matrix of the object channel layer; p represents a number of the pixel; Anchor represents all the Anchor sets; a represents Anchor of the pixel p; Mask(p, a) represents whether there is a label box at the current position corresponding to the training set data (the value corresponds to 0 or 1 according to whether there is a label box); $P_{obj}(p, a, b)$ represents an object prediction value of an a-th Anchor of the pixel p output by a b-th object channel layer; $GT_{obj}(p, a)$ indicates an object real value of the a-th Anchor of the pixel p. It will be understood that the object real value is determined according to the label data of the multiple classes of target objects included in the training set.

It will be noted that the positive sample means that when the target object is detected by the object channel layer, for a pixel, if there is a corresponding label data of the pixel, it is determined that the pixel is a positive sample; vice versa, if there is no corresponding label data of a pixel, it is determined that the pixel is a negative sample. It will be understood that if the pixel is a positive sample, it is substituted into the positive sample formula to calculate $L_{obj+}$; if the pixel is a negative sample, it is substituted into the negative sample formula to calculate $L_{obj-}$.

In step 902, a coordinate loss value is determined by the object detection model training device according to the output results of the multiple box channel layers, the label data of the multiple classes of target objects, and the box loss function.

In a possible implementation, the box loss function satisfies the following Formula 2:

$$L_{box} = \sum_{b=1}^{NP} \sum_{s \in Target(b)} [1 - IOU(P_{box}(s, b), GT_{box}(s))] \qquad \text{Formula 2}$$

$L_{box}$ represents the coordinate loss value; NP represents a total number of the object channel layers; b represents a number of an object channel layer; Target(b) represents an Anchor set of positive samples corresponding to a b-th object channel layer; IOU represents an intersection over union (IOU) calculation function; s represents a number of the positive sample; $P_{box}(s, b)$ represents a coordinate prediction value of an s-th positive sample output by the b-th object channel layer; and $GT_{box}(s)$ represents a coordinate real value of the s-th positive sample. It will be understood that the coordinate real value is determined according to the label data of the multiple classes of target objects included in the training set.

In step 903, a class loss value is determined by the object detection model training device according to the output results of the multiple class channel layers, the label data of the multiple classes of target objects, and the class loss function.

In a possible implementation, the class loss function satisfies the following Formula 3:

$$L_{cls} = \sum\nolimits_{c=1}^{Class} 1[Len(B_{cls}(b)) > 1] \sum\nolimits_{p=1}^{H*W} \sum\nolimits_{a=1}^{Anchor} Mask(p, a) \times \quad \text{Formula 3}$$
$$BCELoss(P_{cls}(p, a, c), GT_{cls}(p, a, c))$$

$L_{cls}$ represents the class loss value; Class represents a total number of classes of the target objects; b represents a number of the object channel layer; $B_{cls}(b)$ represents a set of the second class corresponding to the b-th object channel layer; $Len(B_{cls}(b))$ represents a total number of the second class corresponding to the b-th object channel layer; H represents the number of rows of data matrix of the object channel layer; W represents the number of columns of the data matrix of the object channel layer, Anchor represents all the Anchor sets; Mask(p, a) represents whether there is a label box at the current position corresponding to the training set data; BCELoss represents a BCE loss function; $P_{cls}(p, a, c)$ represents a class prediction value; $GT_{cls}(p, a, c)$ represents a class real value.

It will be understood that the object real value is determined according to the label data of the multiple classes of target objects included in the training set. It will be noted that 1[ . . . ] is an indication function (in a case where the input is True, the value is 1, otherwise the value is 0).

In step 904, the first loss value is determined by the object detection model training device according to the object loss value, the coordinate loss value, and the class loss value.

Correspondingly, in a possible implementation, the object detection model training device adds the object loss function, the box loss function, and the class loss function, and determines the added formula result as the first loss function.

Based on the above technical solution, in the embodiments of the present disclosure, the first loss function of the detection model for the detection results of the multiple classes of target objects is determined according to the output results of the three channel layers in the detection model and the training set, the first loss function is able to reflect a difference between the detection results of the detection model and the correct results in the label data, which facilitates the adjustment for the parameter in the detection model in the subsequent process, so that the detection results of the detection model are gradually close to the correct results in the label data.

A process of verifying the accuracy rate of the object detection model by the object detection model training device will be specifically described below.

As a possible embodiment of the present disclosure, with reference to FIG. 6, as shown in FIG. 10, after step 602, steps 1001 to 1002 are further included.

In step 1001, a verification set is acquired by the object detection model training device.

The verification set includes label data of the multiple classes of target objects. For example, the verification set includes multiple verification datasets, and each verification dataset includes image data and data labeling one or more classes of target objects. It will be understood that the class of the target object labeled by the verification set is the same as the class of the target object labeled by the training set in step 601.

For example, for the training set used to train the detection model, the classes of the corresponding labeled target objects are people, motor vehicle and non-motor vehicle. Accordingly, for the verification set used to verify the object detection model, the classes of the corresponding labeled target objects are also people, motor vehicle and non-motor vehicle.

In step 1002, the multiple verification datasets are respectively input into the object detection model by the object detection model training device to obtain the accuracy rates of the multiple verification datasets.

Optionally, the object detection model training device determines the verification detection result of the object detection model according to the verification set. It will be understood that the manner in which the object detection model training device determines the verification detection result according to the verification set is the same as the manner in which the object detection model training device determines the detection results of the multiple classes of target objects according to the training set. For details, reference is made to the descriptions in the steps 1101 to 1103.

Optionally, the object detection model training device determines the accuracy of the detection model according to the verification detection result of the detection module. Here, the accuracy rate is expressed in the form of mAP. Based on the above technical solution, in the present disclosure, it is possible to further verify the accuracy rate of the detection module according to the verification set after the detection model training is completed, so that the detection model has a good detection effect when put into practical application.

Figure 11:
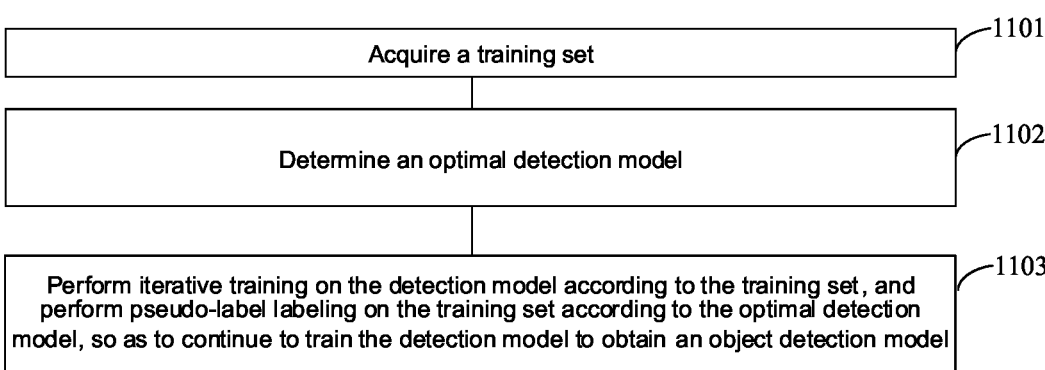
FIG. 11 is a flow diagram of yet another object detection model training method, in accordance with some embodiments.

As a possible embodiment of the present disclosure, with reference to FIG. 6, as shown in FIG. 11, the present disclosure provides an object detection model training method, including the following steps 1101 to 1103.

In step 1101, a training set is acquired by the object detection model training device.

The training set includes multiple training datasets, each training dataset includes label data of one or more classes of target objects, and classes of target objects labeled by at least two datasets of the multiple datasets are different.

It will be understood that the training set here is the same as the training set described in step 601 above, and details will not be repeated in this embodiment.

In step 1102, an optimal detection model is determined by the object detection model training device.

The optimal detection model is a detection model with the highest accuracy rate among the historical training detection models, and the historical training detection models include detection models each whose parameter is updated after each iteration training.

Optionally, the accuracy rate here is evaluated by the mAP value; that is, among the detection models each whose parameter has been updated after each iterative training, the detection model with the highest mAP is the optimal detection model.

It will be noted that, the architecture of the detection model in this embodiment adopts the same architecture as in the foregoing embodiments, i.e., is the same as that described in step 502 above. Alternatively, the architecture of the detection model in the embodiments adopts other models with the convolutional architecture. For the convenience of description, the solution of this embodiment will be described below by taking an example in which the architecture of the detection model in this embodiment as the same as that in the foregoing embodiments.

In step 1103, iterative training is performed on the detection model by the object detection model training device according to the training set, and pseudo-label labeling is performed on the training set by the object detection model training device according to the optimal detection model, so as to continue to train the detection model to obtain the object detection model.

It will be noted that, for the detailed process of the iterative training for the detection model by the object detection model training device according to the training set, reference is made to the steps 701 to 704 described above, which is not repeated here.

In a possible implementation, the object detection model training device performing pseudo-labeling on the training set according to the optimal detection model to continue to train the detection model to obtain the object detection model includes: performing pseudo-labeling on the lacking target objects of each training dataset of the training set according to the optimal detection model to obtain positive sample label data and negative sample label data, the lacking target objects being target objects whose classes are not labeled by the training dataset; a positive sample loss value is determined according to positive sample label data and a positive sample loss function, and a negative sample loss value is determined according to negative sample label data and a negative sample loss function by the object detection model training device; the parameter of the detection model are adjusted according to the total loss value by the object detection model training device.

It will be noted that, as for the specific process of performing pseudo-labeling on the training set according to the optimal detection model by the object detection model training device to continue to train the detection model to obtain the object detection model, reference is made to the following steps 1201 to 1205, which will not be repeated here.

The object detection model is a detection model that meets a preset requirement after iterative training and is able to be used in practical applications. For example, meeting the preset requirement means that a total loss function of the detection results of the detection model reaches convergence, or the accuracy rate of the detection result of the detection model reaches a preset required percentage, and the accuracy rate here adopts the mAP value.

It will be understood that the total loss value is determined by the first loss value, the positive sample loss value and the negative sample loss value. Correspondingly, the total loss function includes a first loss function, a positive sample loss function, and a negative sample loss function.

Based on the solution described above, in the embodiments of the present disclosure, during each iterative training process of the detection model, the optimal detection model with the highest historical accuracy is determined, and the training set is labeled with pseudo-labels by using the optimal detection model. Thus, fusion training is performed on the detection model by combining the label data obtained after the training set is labeled with pseudo-labels and label data of a real training set, which improves detection recall rate of the object detection model in cross-scenario. Moreover, in the actual application process of the object detection model, it is possible to achieve high detection accuracy.

In combination with the above step 1103, the process of performing pseudo-label labeling on the detection model after the iterative training is performed by the object detection model training device according to the optimal detection model will be specifically described below.

Figure 12:
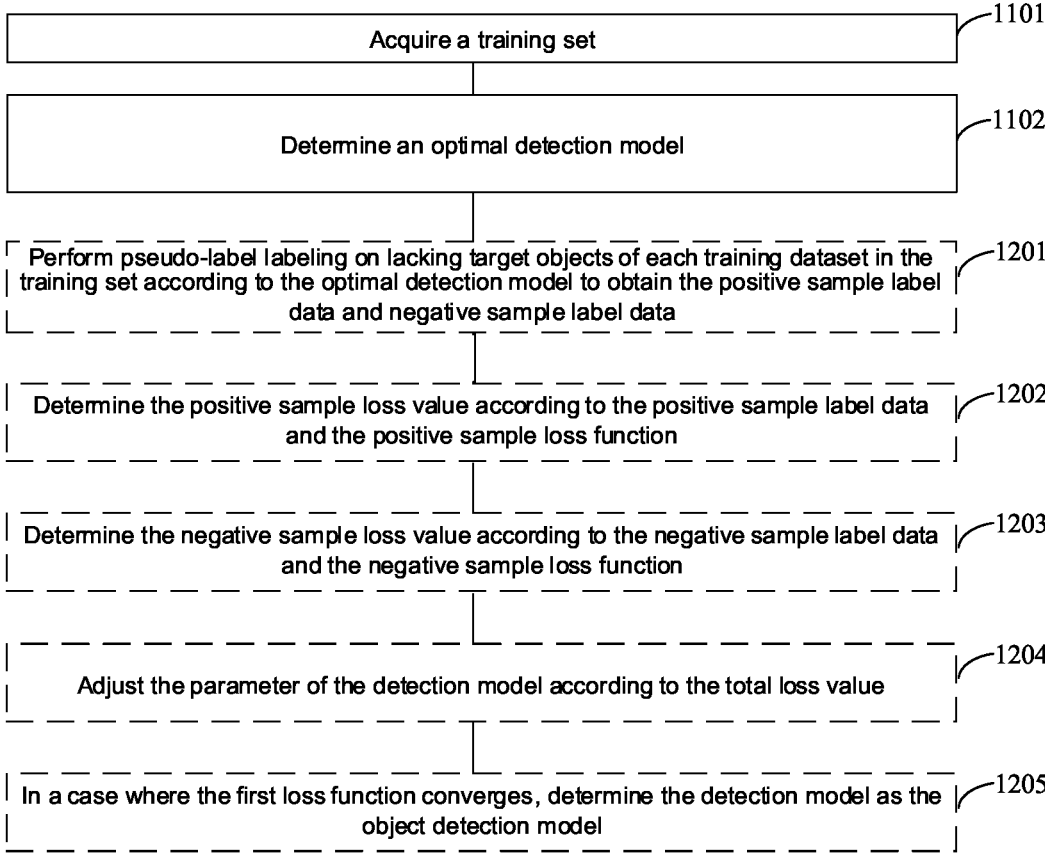
FIG. 12 is a flow diagram of yet another object detection model training method, in accordance with some embodiments.

As a possible embodiment of the present disclosure, with reference to FIG. 11, as shown in FIG. 12, the above step 1103 includes the following steps 1201 to 1205.

In step 1201, the pseudo-label labeling is performed on the lacking target objects of each training dataset in the training set by the object detection model training device according to the optimal detection model to obtain the positive sample label data and negative sample label data.

Optionally, the training set is input into the optimal detection model by the object detection model training device to determine a detection score of the optimal detection model for each target object.

Optionally, the detection score is implemented as a confidence score of the optimal detection model for the target object.

Further, the positive sample label data is determined as follows: for each target object, if the detection score of the optimal detection model for the target object is greater than or equal to a positive sample score threshold, the label data corresponding to the target object is determined as the positive sample label data.

The negative sample label data is determined as follows: for each target object, if the detection score of the optimal detection model for the target object is less than or equal to a negative sample score threshold, then the label data corresponding to the target object is determined as the negative sample label data.

It will be noted that, for the process of determining the positive sample score threshold and the negative sample score threshold, reference will be made to the following steps 1301 to 1303, which will not be repeated here.

In step 1202, the positive sample loss value is determined by the object detection model training device according to the positive sample label data and the positive sample loss function.

In a possible implementation, the positive sample loss function satisfies the following Formula 4.

$$\text{Loss}_{pos} = \sum\nolimits_{score(s) > TH_{pos}} score(s) \cdot BCELoss(P_{pos}(s), 1) \quad \text{Formula 4}$$

$\text{Loss}_{pos}$ represents the positive sample loss value; score(s) represents the detection score of each lacking target object; $TH_{pos}$ represents the positive sample score threshold; BCELoss represents the BCE loss function; and $P_{pos}(s)$ represents a predicted value corresponding to the Anchor of the s-th positive sample label data.

In step 1203, the negative sample loss value is determined by the object detection model training device according to the negative sample label data and the negative sample loss function.

In a possible implementation, the negative sample loss function satisfies the following Formula 5.

$$\text{Loss}_{neg} = \sum\nolimits_{score(s) > TH_{neg}} score(s) \cdot BCELoss(P_{neg}(s), 1) \quad \text{Formula 5}$$

$\text{Loss}_{neg}$ represents the negative sample loss function; score(s) represents the detection score of each lacking target object; $TH_{neg}$ represents the negative sample score threshold; BCELoss represents the BCE loss function; $P_{neg}(s)$ represents a predicted value corresponding to the Anchor of the s-th negative sample label data.

In step 1204, the parameter of the detection model is adjusted by the object detection model training device according to the total loss value.

The total loss value is determined according to the first loss value, the positive sample loss value and the negative sample loss value.

It will be understood that, if the architecture of the detection model in this embodiment is the same as that described in step 502, the total loss value in this embodiment is determined by a weighted sum of the first loss value, the positive sample loss value and the negative sample loss value. The calculation method of the first loss value is referred to above.

For example, the object detection model training device predetermines a first weight, a second weight and a third weight, and the total loss value is calculated by adding a product of the first weight and the first loss value, a product of the second weight and the positive sample loss value, and a product of the third weight and the negative sample loss value.

In step 1205, in a case where the first loss function converges, the detection model is determined as the object detection model by the object detection model training device.

The total loss function includes a first loss function, the positive sample loss function, and the negative sample loss function. With reference to the description of the step 1204, the total loss function is expressed by adding a product of the first loss function and the first weight, a product of the positive sample loss function and the second weight, and a product of the negative sample loss function and the third weight.

Based on the above technical solution, in the embodiments of the present disclosure, during the iterative training process of the detection model, it is possible to perform pseudo-label labeling on the training set by using the optimal detection model to determine the positive sample label data and negative sample label data in the training set, and then the corresponding loss value is obtained, and the parameter of the detection model are continuously updated according to the loss value, so that detection result output each time is closer to the correct result reflected by the label data of the target object in the training set. In this way, the detection model obtained in such way is able to complete the detection of the target object in subsequent practical applications well.

In conjunction with step 1201, the process of determining the positive sample score threshold and the negative sample score threshold will be described below.

As a possible embodiment of the present disclosure, with reference to FIG. 12, as shown in FIG. 13, the above step 1201 includes the following steps 1301 to 1304.

In step 1301, a verification set is acquired by the object detection model training device.

The verification set includes multiple verification datasets in one-to-one correspondence with multiple training datasets, each verification dataset includes label data of one or more classes of target objects, and the accuracy rate of the detection model is determined according to the verification set.

It will be understood that the verification set here is the same as the verification set described above, and will not be further described here.

In step 1302, the detection score of the optimal detection model for each target object in the verification set is determined by the object detection model training device.

It will be noted that the detection score is a quantified parameter for a detection result of the optimal detection model. For a target object, the specific process of determining the detection score through the detection model will not be described in this embodiment.

In step 1303, the negative sample score threshold is determined by the object detection model training device according to the detection score of each target object and a preset recall rate.

For example, the object detection model training apparatus sets the preset recall rate to 0.95. In this case, the object detection model training device sets the initial negative sample score threshold and continuously adjusts it until the recall rate of the optimal detection module for the detection scores of all the target objects meets the preset recall rate of 0.95, then in this case, the negative sample score threshold is output as the final negative sample score threshold.

In step 1304, the positive sample score threshold is determined by the object detection model training device according to the detection score of each target object and a preset accuracy rate.

For example, the object detection model training device sets the preset accuracy to 0.95. In this case, the object detection model training device sets the initial positive sample score threshold and continuously adjusts it until the accuracy of the detection scores of the optimal detection module for all the target objects meets the preset accuracy of 0.95, then in this case, the positive sample score threshold is output as the final positive sample score threshold.

Based on the above technical solution, in the embodiments of the present disclosure, it is possible to determine the positive sample score threshold and negative sample score threshold for respectively determining the positive sample label data and the negative sample label data based on the verification set and the optimal detection model determined from the historical detection models, which facilitates the subsequent progress of the training process.

In some embodiments of the present disclosure, the object detection system and the object detection model training device that implement the foregoing method may be divided into functional modules or functional unit according to the methods in above examples, e.g., may be divided in a way that each functional module or functional unit corresponds to a function, or that two or more functions are integrated into one processing module. The integrated modules may be implemented in the form of hardware or software functional modules or functional units. It will be noted that, the division of modules or units in the embodiments of the present disclosure is schematic, which is merely a logical function division, and there may be other division manners in actual implementation.

Figure 14:
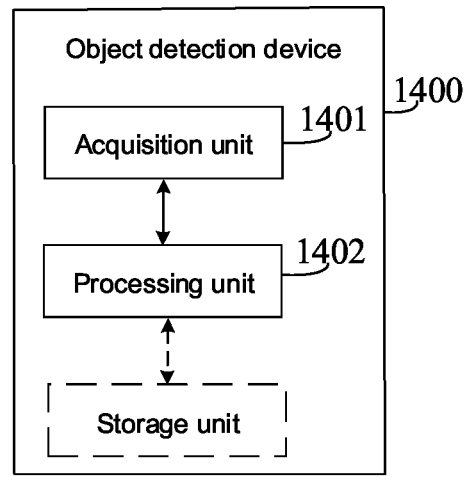
FIG. 14 is a structural diagram of an object detection device, in accordance with some embodiments.

As shown in FIG. 14, which is a schematic structural diagram of an object detection device 1400 provided according to some embodiments, and the device includes an acquisition unit 1401 and a processing unit 1402.

The acquisition unit 1401 is configured to acquire an image to be detected.

The processing unit 1402 is configured to process the image to be detected by using an object detection model to obtain an object detection result corresponding to a target object to be detected in the image to be detected.

In some embodiments, the processing unit 1402 is further configured to, in a case where the detection result calculated by the object channel layer corresponding to the box channel layer is greater than or equal to a threshold, acquire a coordinate prediction value of the box channel layer.

In some embodiments, the processing unit 1402 is further configured to, in a case where the detection result calculated by the object channel layer corresponding to the box channel layer is less than a threshold, not acquire the coordinate prediction value of the box channel layer.

Optionally, the object detection device 1400 further includes a storage unit (shown by a dotted line box in FIG. 14), and storage unit is stored programs or instructions therein. The processing unit 1402 causes, when executing the programs or instructions, the object detection device 1400 to perform the object detection module training method as described in any one of the above embodiments.

In addition, for the technical effects of the object detection device 1400 described in FIG. 14, reference is made to the technical effects of the object detection method described in the above embodiments, which will not be repeated here.

Figure 15:
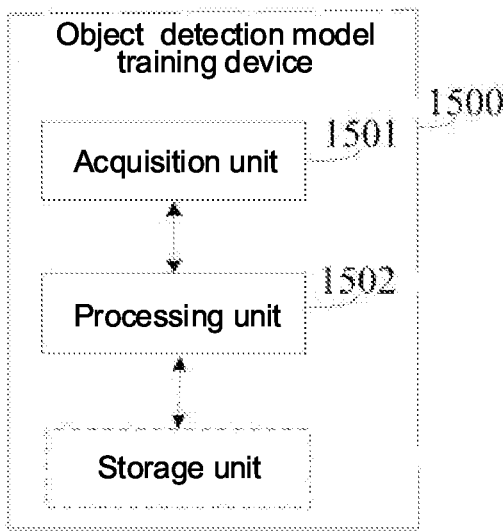
FIG. 15 is a structural diagram of an object detection model training device, in accordance with some embodiments.

As shown in FIG. 15, which is a schematic structural diagram of an object detection model training device 1500 provided by some embodiments, and the device includes an acquisition unit 1501 and a processing unit 1502.

The acquisition unit 1501 is configured to acquire a training set. The training set includes multiple training datasets, each training dataset includes label data of one or more classes of target objects, and classes of target objects labeled by at least two datasets of the multiple datasets are different.

The processing unit 1502 is configured to perform iterative training on the detection model according to the training set to obtain a trained object detection model.

In some embodiments, the processing unit 1502 is further configured to: for each iteration, input the training set into the detection model to determine the detection results of the multiple classes of target objects.

In some embodiments, the processing unit 1502 is further configured to: calculate the first loss value according to the detection results of the multiple classes of target objects and the first loss function; and adjust the parameter of the detection model.

The first loss calculation function includes an object loss function, a box loss function, and a class loss function.

In some embodiments, the processing unit 1502 is further configured to determine the detection model as a trained object detection model in a case where the first loss function converges.

In some embodiments, the acquisition unit 1501 is further configured to acquire a verification set. The verification set includes multiple verification datasets in one-to-one correspondence with multiple training datasets, and each verification dataset includes label data of one or more classes of target objects.

In some embodiments, the processing unit 1502 is further configured to: respectively input the multiple verification datasets into the object detection model to obtain accuracy rates of the multiple verification datasets.

In some embodiments, the processing unit 1502 is further configured to: sum the accuracy rates of the multiple verification datasets to be as a total accuracy rate of the trained object detection model, or the accuracy rates of the multiple verification datasets are taken together as the total accuracy rate of the trained object detection model.

Optionally, the object detection model training device 1500 further includes a storage unit (shown by a dotted line box in FIG. 14), and the storage unit has stored programs or instructions therein. The processing unit 1502, when executing the programs or instructions, causes the object detection model training device 1500 to perform the object detection module training method as described in any one of the above method embodiments.

In addition, for the technical effects of the object detection model training device 1500 described in FIG. 15, reference is made to the technical effects of the object detection model training device 1500 described in the above-mentioned embodiments, which will not be repeated here.

Figure 16:
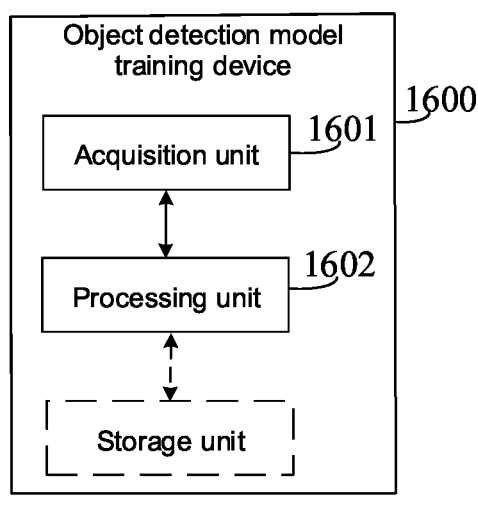
FIG. 16 is a structural diagram of another object detection model training device, in accordance with some embodiments.

As shown in FIG. 16, which is a schematic structural diagram of an object detection model training device 1600 provided according to some embodiments, and the device includes an acquisition unit 1601 and a processing unit 1602.

The acquisition unit is configured to acquire a training set. The training set includes multiple training datasets, each training dataset includes label data of one or more classes of target objects, and classes of target objects labeled by at least two datasets of the multiple datasets are different.

The processing unit 1602 is configured to determine an optimal detection model. The optimal detection model is a detection model with the highest accuracy rate among the historical training detection models, and the historical training detection models include detection models whose parameter have been updated after each iteration of training.

The processing unit 1602 is further configured to: perform iterative training on the detection model according to the training set; perform pseudo-label labeling on the training set according to the optimal detection model to continue to train the detection model to obtain the object detection model.

In some embodiments, the processing unit 1602 is further configured to determine pseudo-label data according to the optimal detection model. The pseudo-label data includes label data of multiple lacking target objects, and the classes of the lacking target objects are different from the classes of the target objects corresponding to the label data included in the training set.

In some embodiments, the processing unit 1602 is further configured to label the lacking target objects in the training set according to the pseudo-label data to obtain positive sample label data and negative sample label data.

In some embodiments, the processing unit 1602 is further configured to determine a positive sample loss value according to the positive sample label data and the positive sample loss function.

In some embodiments, the processing unit 1602 is further configured to determine a negative sample loss value according to the negative sample label data and the negative sample loss function.

In some embodiments, the processing unit 1602 is further configured to adjust the parameter of the detection model according to the total loss value. The total loss value is determined according to the first loss value, the positive sample loss value and the negative sample loss value.

In some embodiments, the processing unit 1602 is further configured to determine the detection model as the object detection model in a case where the total loss function converges. The total loss function includes the first loss function, the positive sample loss function, and the negative sample loss function.

In some embodiments, the processing unit 1602 is further configured to: input the training set into the optimal detection model; and determine a detection score of the optimal detection model for each lacking target object.

In some embodiments, the processing unit 1602 is further configured to: for each target object, if the detection score of the optimal detection model for the lacking target object is greater than or equal to a positive sample score threshold, determine the label data corresponding to the lacking target object as the positive sample label data.

In some embodiments, the processing unit 1602 is further configured to: for each target object, if the detection score of the optimal detection model for the lacking target object is less than or equal to a negative sample score threshold, determine the label data corresponding to the lacking target object as a negative sample label data.

In some embodiments, the acquisition unit 1601 is further configured to acquire a verification set; the verification set includes multiple verification datasets corresponding to the multiple training datasets, each verification dataset includes label data of one or more classes of target objects, and the accuracy rate of the detection model is determined according to the verification set.

In some embodiments, the processing unit 1602 is further configured to determine a detection score of the optimal detection model for each target object in the verification set.

In some embodiments, the processing unit 1602 is further configured to determine the negative sample score threshold according to the detection score of each target object and a preset recall rate.

In some embodiments, the processing unit 1602 is further configured to determine the positive sample score threshold according to the detection score of each target object and a preset accuracy rate.

In some other embodiments, the processing unit 1602 is further configured to determine a first weight, a second weight and a third weight.

In some embodiments, the processing unit 1602 is further configured to determine the total loss value according to a product of the first weight and the first loss value, a product of the second weight and the positive sample loss value, and a product of the third weight and the negative sample loss value.

Optionally, the object detection model training device 1600 further includes a storage unit (shown by a dotted line box in FIG. 14), and the storage unit has stored programs or instructions therein. The processing unit 1602, when executing the programs or instructions, causes the object detection model training device 1600 to perform the object detection module training method as described in the above method embodiments.

In addition, for the technical effects of the object detection model training device 1600 described in FIG. 16, reference is made to the technical effects of the object detection model training device 1600 described in the above embodiments, which will not be repeated here.

Figure 17:
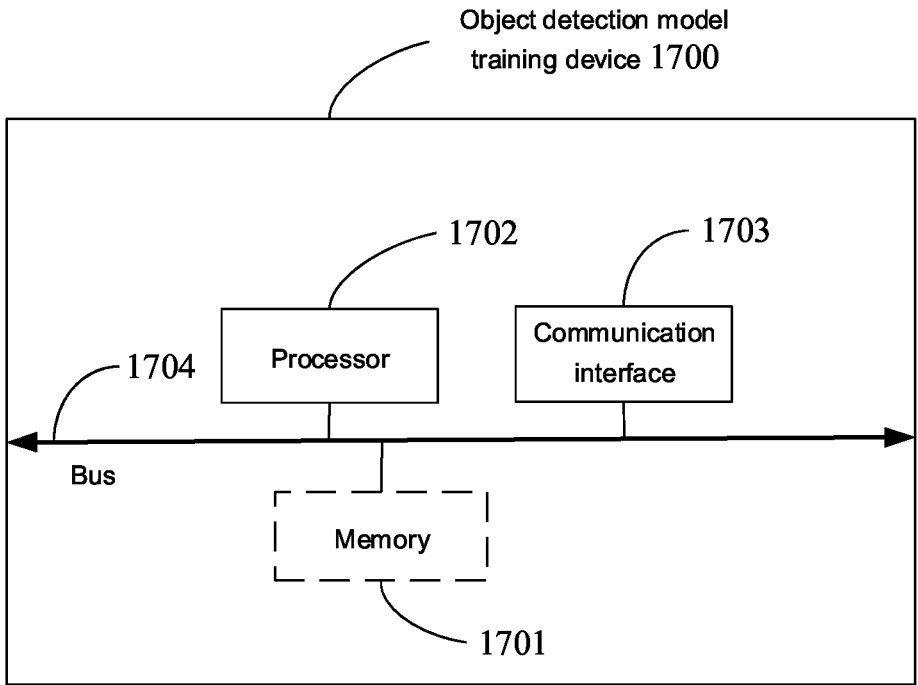
FIG. 17 is a structural diagram of another object detection device, in accordance with some embodiments.

FIG. 17 shows another possible structural schematic diagram of the object detection device involved in some of the above embodiments. The object detection device 1700 includes a processor 1702 and a communication interface 1703. The processor 1702 is configured to perform control manage on actions of the object detection device 1700, for example, to perform the steps executed by the acquisition unit 1401 and the processing unit 1402, and/or configured to perform other processes of the techniques described herein. The communication interface 1703 is configured to support communication between the object detection device 1700 and other network entities.

The object detection device 1700 further includes a memory 1701 and a bus 1704, and the memory 1701 is configured to store program codes and data of the object detection device 1700.

The memory 1701 is a memory or the like in the target detection device 1700. The memory includes a volatile memory, such as a random access memory; alternatively, the memory includes a non-volatile memory, such as a read-only memory, a flash memory, a hard disk or solid state disk; alternatively, the memory includes a combination of the above types of memories.

The processor 1702 implements or executes various illustrative logical blocks, modules and circuits described in content of the present disclosure. The processor is a central processing unit, a general-purpose processor, a digital signal processor (DSP), an application specific integrated circuit, a field programmable gate array, any other programmable logic device, a transistor logic device, a hardware component, or any combination thereof. The processor implements or executes various illustrative logical blocks, modules and circuits described in the content of the present disclosure. Alternatively, the processor is a combination that implements computing functions, e.g., a combination including one or more microprocessors, a combination of a DSP and a microprocessor, or the like.

The bus 1704 is an extended industry standard architecture (EISA) bus or the like. The bus 1704 is grouped into address bus, data bus, control bus and so on. For ease of representation, only one thick line is used in FIG. 17, but it does not mean that there is only one bus or one type of bus.

Alternatively, the object detection device 1700 in FIG. 17 is a chip. The chip includes one or more than two (including two) processors 1702 and a communication interface 1703.

Optionally, the chip further includes a memory 1701. The memory 1701 includes a read-only memory and a random access memory, and provides operation instructions and data for the processor 1702. Part of the memory 1701 further includes a non-volatile random access memory (NVRAM).

In some implementations, the memory 1701 stores the following elements: execution modules, data structures, or their subsets, or their extended sets.

In the embodiments of the present disclosure, the corresponding operation is performed by calling the operation instructions stored in the memory 1701 (the operation instructions are stored in the operation system).

Figure 18:
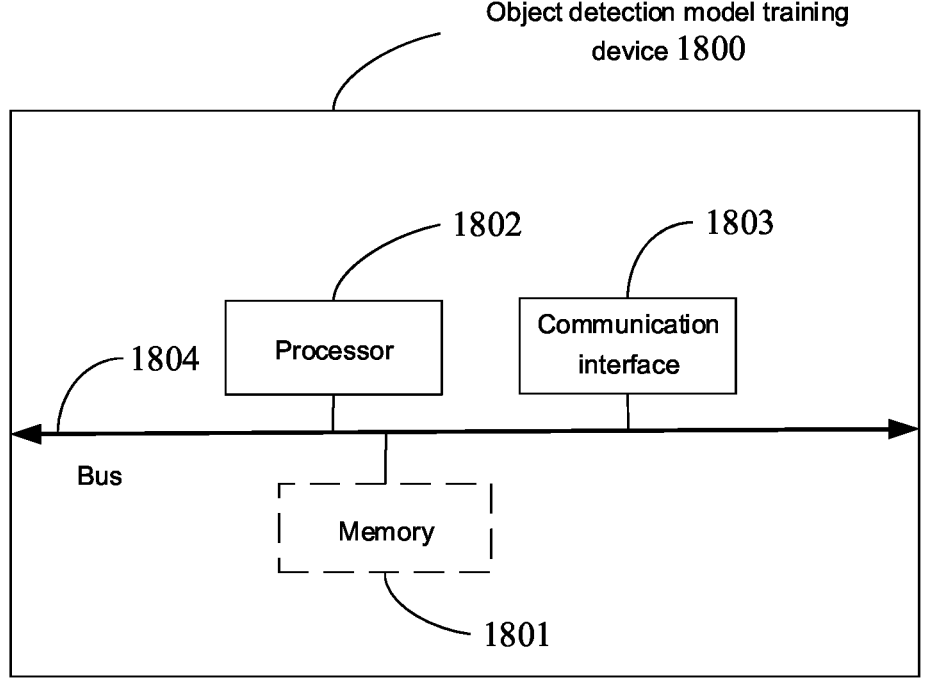
FIG. 18 is a structural diagram of yet another object detection model training device, in accordance with some embodiments.

FIG. 18 shows another possible structural schematic diagram of the object detection model training device involved in the above embodiments. The object detection model training device 1800 includes a processor 1802 and a communication interface 1803. The processor 1802 is configured to perform control manage on actions of the object detection model training device 1800, e.g., to perform the steps performed by the acquisition unit 1501, the processing unit 1502, the acquisition unit 1601, and the processing unit 1602, and/or to perform other processes of the techniques described herein. The communication interface 1803 is configured to support communication between the object detection model training device 1800 and other network entities. The object detection model training device 1800 further includes a memory 1801 and a bus 1804, and the memory 1801 is configured to store program codes and data of the object detection model training device 1800.

The memory 1801 is a memory or the like in the object detection model training device 1800. The memory includes a volatile memory, such as a random access memory; alternatively, the memory includes a non-volatile memory, such as a read-only memory, a flash memory, a hard disk or solid state disk; alternatively, the memory includes a combination of the above types of memories.

The processor 1802 implements or executes various illustrative logical blocks, modules and circuits described in content of the present disclosure. The processor is a central processing unit, a general-purpose processor, a digital signal processor (DSP), an application specific integrated circuit, a field programmable gate array, or any other programmable logic device, a transistor logic device, a hardware component, or any combination thereof. The processor implements or executes various illustrative logical blocks, modules and circuits described in the content of the present disclosure. Alternatively, the processor is a combination that implements computing functions, e.g., a combination including one or more microprocessors, a combination of a DSP and a microprocessor, or the like.

The bus 1804 is an extended industry standard architecture (EISA) bus or the like. The bus 1804 is grouped into address bus, data bus, control bus and so on. For ease of representation, only one thick line is used in FIG. 18, but it does not mean that there is only one bus or one type of bus.

Alternatively, the object detection model training device 1800 in FIG. 18 is a chip. The chip includes one or more than two (including two) processors 1802 and a communication interface 1803.

Optionally, the chip further includes a memory 1801. The memory 1801 includes a read-only memory and a random access memory, and provides operation instructions and data for the processor 1802. Part of the memory 1801 further includes a non-volatile random access memory (NVRAM).

In some implementations, the memory 1801 stores the following elements: execution modules, data structures, or their subsets, or their extended sets.

In the embodiments of the present disclosure, the corresponding operation is performed by calling the operation instructions stored in the memory 1801 (the operation instructions are stored in the operation system).

From description of the above embodiments, those skilled in the art will clearly understand that, for convenience and brevity of description, an example is only given according to the above division of functional modules. In practical applications, the above functions are allocated to different functional modules as needed. That is, an internal structure of the device is divided into different functional modules to perform all or part of the functions described above. For the specific working process of the above-described system, device, and unit, reference is made to the corresponding process in the foregoing method embodiments, and details are not repeated here.

Some embodiments of the present disclosure provide a computer-readable storage medium (e.g., a non-transitory computer-readable storage medium), the computer-readable storage medium has stored a computer program instruction, and the computer program instruction, when executed on a computer (e.g., an object detection module training device), causes the computer to perform the object detection method and object detection model training method according to any of the above embodiments.

For example, the computer-readable storage medium includes, but is not limited to, a magnetic storage device (e.g., a hard disk, a floppy disk or a magnetic tape), an optical disk ((e.g., a compact disk (CD), or a digital versatile disk (DVD)), a smart card and a flash memory device (e.g., an erasable programmable read-only memory (EPROM), a card, a stick or a key driver). The various computer-readable storage media described in the embodiments of the present disclosure may represent one or more devices and/or other machine-readable storage media for storing information. The term "machine-readable storage medium" includes, but is not limited to, wireless channels and various other media capable of storing, containing, and/or carrying instructions and/or data.

Some embodiments of the present disclosure provide a computer program product; for example, the computer program product is stored on a non-transitory computer-readable storage medium. The computer program product includes computer program instructions that, when run on a computer (e.g., an object detection module training device), cause the computer to perform the object detection method and object detection model training method according to the above embodiments.

Some embodiments of the present disclosure provide a computer program. When executed on the computer (e.g., an object detection module training device), the computer program causes the computer to perform the object detection method and object detection model training method in the above embodiments.

Beneficial effects of the computer-readable storage medium, computer program product and computer program described above are the same as the beneficial effects of the object detection method and object detection model training method described in the above embodiments, and will not be repeated here.

In several embodiments provided in the present disclosure, it will be understood that the disclosed systems, devices and methods are implemented through other manners. For example, the embodiments of the device described above are merely exemplary. For example, the division of the units is only a logical functional division. In actual implementation, there are other division manners. For example, a plurality of units or components are combined or integrated into another system, or some features may be ignored or not executed. In addition, the mutual coupling or direct coupling or communication connection shown or discussed is an indirect coupling or communication connection through some interfaces, devices or units, and may be in an electrical, mechanical or other form.

The units described as separate components may or may not be physically separated, and the components shown as units may be physical units, that is, they may be located in one place, or may be distributed to multiple network units. Some or all of the units may be selected according to actual needs to achieve the purposes of the solutions in the embodiments.

The functional units in the embodiments of the present disclosure may be integrated into one processing module or may be separate physical units, or two or more units may be integrated into one module.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. An object detection method, comprising:
acquiring an image to be detected; and
processing the image to be detected by using an object detection model to obtain an object detection result corresponding to a target object to be detected in the image to be detected;
wherein the object detection model includes a feature extraction network and an object detection network;
the feature extraction network is used to extract features of the image to be detected to obtain image features related to multiple classes of target objects; and
the object detection network is used to process the image features to obtain the object detection result;

wherein the object detection network includes a class channel layer, multiple object channel layers and multiple box channel layers;

an object channel layer is used to output a detection prediction value representing whether a target object exists, and each object channel layer is used to detect at least one of the multiple classes of target objects, and classes of target objects detecting by the multiple object channel layers are different;

the class channel layer is used to output a class prediction value corresponding to the multiple classes of target objects;

a box channel layer is used to output a coordinate prediction value corresponding to the target object;

the object detection result is calculated based on the detection prediction value, the class prediction value and the coordinate prediction value wherein the multiple box channel layers are in one-to-one correspondence with the multiple object channel layers, and each box channel layer has a same class as the target object detected by the corresponding object channel layer; and the box channel layer is used to obtain the coordinate prediction value of the target object in a case where the corresponding object channel layer detects the target object.

2. The method according to claim 1, wherein the object detection result includes a detection result and a coordinate result; the detection result is obtained by fusion calculation based on the detection prediction value of the object channel layer and the corresponding class prediction value;

the box channel layer being used to obtain the coordinate prediction value of the target object in a case where the corresponding object channel layer detects the target object includes: obtaining the coordinate prediction value of the box channel layer in a case where the detection result calculated by the object channel layer corresponding to the box channel layer is greater than or equal to a threshold value; and obtaining no coordinate prediction value of the box channel layer in a case where the detection result calculated by the object channel layer corresponding to the box channel layer is less than the threshold value.

3. The method according to claim 2, wherein structures of the class channel layer, the multiple object channel layers and the multiple box channel layers are each a convolution structure, and a size of the convolution kernel of the convolution structure is one by one.

4. The method according to claim 3, wherein the feature extraction network includes a backbone network and a neck network; the backbone network is used to determine an image feature of a general class according to the image to be detected, and the neck network is used to determine the image features related to the multiple classes of target objects according to the image feature of the general class.

5. A non-transitory computer-readable storage medium having stored instructions that, when run on a computer, cause the computer to perform the object detection method according to claim 1.

6. An electric device, comprising a memory and a processor, wherein the memory stores computer program instructions, and the processor executes the computer program instructions to implement the object detection method according to claim 1.

7. An object detection model training method, comprising:

acquiring a training set, wherein the training set includes multiple training datasets, each training dataset includes label data of multiple classes of target objects, and classes of target objects labeled by at least two datasets of the multiple datasets are different; and performing iterative training on a detection model according to the training set to obtain an object detection model;

wherein the object detection model includes a feature extraction network and an object detection network;

the feature extraction network is used to extract features of the image to be detected to obtain image features related to multiple classes of target objects; and the object detection network is used to process the image features to obtain the object detection result;

wherein the object detection network includes a class channel layer, multiple object channel layers and multiple box channel layers;

an object channel layer is used to output a detection prediction value representing whether a target object exists, and each object channel layer is used to detect at least one of the multiple classes of target objects, and classes of target objects detecting by the multiple object channel layers are different;

the class channel layer is used to output a class prediction value corresponding to the multiple classes of target objects;

a box channel layer is used to output a coordinate prediction value corresponding to the target object;

the object detection result is calculated based on the detection prediction value, the class prediction value and the coordinate prediction value, wherein the multiple box channel layers are in one-to-one correspondence with the multiple object channel layers, and each box channel layer has a same class as the target object detected by the corresponding object channel layer; and the box channel layer is used to obtain the coordinate prediction value of the target object in a case where the corresponding object channel layer detects the target object.

8. The method according to claim 7, wherein performing the iterative training on the detection model according to the training set to obtain the object detection model, includes:

inputting, for each iteration, the training set into the detection model to determine detection results of the multiple classes of target objects; and calculating a first loss value according to the detection results of the multiple classes of target objects and a first loss function; and adjusting a parameter of the detection model; wherein the first loss function includes an object loss function, a box loss function, and a class loss function; and determining, in a case where the first loss function converges, the detection model as the object detection model.

9. The method according to claim 8, wherein the object loss function satisfies the following formula:

$$
\begin{cases}
L_{obj+} = \displaystyle\sum_{b=1}^{NP} \sum_{s \in Target(b)} BCELoss(P_{obj}(s, b), GT_{obj}(s)) \\
L_{obj-} = \displaystyle\sum_{b=1}^{NP} 1(L_{obj}(b) \subseteq L_{data}) \times \sum_{p=1}^{H*W} \sum_{a=1}^{Anchor} [1 - \mathrm{Mask}(p, a)] \times \\
\qquad\qquad BCELoss(P_{obj}(p, a, b), GT_{obj}(p, a))
\end{cases}
$$

wherein $L_{obj+}$ represents an object loss value of positive samples in the training set; NP represents a total number of the object channel layers; b represents a number of an object channel layer; Target(b) represents an Anchor set of positive samples corresponding to a b-th object channel layer; BCELoss represents a binary cross entropy (BCE) loss function; s represents a number of a positive sample; $P_{obj}(s, b)$ represents an object prediction value corresponding to the b-th object channel layer and Anchor of an s-th positive sample; $GT_{obj}(s)$ represents an object real value corresponding to the Anchor of the s-th positive sample; $L_{obj-}$ represents an object loss value of negative samples in the training set; $1(\ldots)$ is an indication function, in a case where an input is True, a value is 1, otherwise the value is 0; $L_{obj}(b)$ represents a class subset of a target object corresponding to the b-th object channel layer; $L_{data}$ represents a class set of a target object labeled by current training data; H represents the number of rows of data matrix output by the object channel layer; W represents the number of columns of the data matrix output by the object channel layer; p represents a number of a pixel; Anchor represents all Anchor sets; a represents Anchor of the pixel p; Mask(p, a) represents whether there is a label box at a position corresponding to the pixel p; $P_{obj}(p, a, b)$ represents an object prediction value of an a-th Anchor of the pixel p output by a b-th object channel layer; $GT_{obj}(p, a)$ represents an object real value of the a-th Anchor of the pixel p.

10. The method according to claim 8, wherein the box loss function satisfies the following formula:

$$L_{box} = \sum_{b=1}^{NP} \sum_{s \in Target(b)} [1 - IOU(P_{box}(s, b), GT_{box}(s))]$$

wherein $L_{box}$ represents a coordinate loss value; NP represents a total number of the object channel layers; b represents a number of an object channel layer; Target(b) represents an Anchor set of positive samples corresponding to a b-th object channel layer; IOU represents an intersection over union (IOU) calculation function; s represents a number of a positive sample; $P_{box}(s, b)$ represents a coordinate prediction value of an s-th positive sample output by the b-th object channel layer; and $GT_{box}(s)$ represents a coordinate real value of the s-th positive sample.

11. The method according to claim 8, wherein the class loss function satisfies the following formula:

$$L_{cls} = \sum_{c=1}^{Class} 1[Len(B_{cls}(b)) > 1]$$

$$\sum_{p=1}^{H*W} \sum_{a=1}^{Anchor} Mask(p, a) \times BCELoss(P_{cls}(p, a, c), GT_{cls}(p, a, c))$$

wherein $L_{cls}$ represents a class loss value; Class represents a total number of classes of the target objects; $1[\ldots]$ is an indication function, in a case where an input is True, a value is 1, otherwise the value is 0; b represents a number of an object channel layer; $B_{cls}(b)$ represents a set of a second class corresponding to the b-th object channel layer; $Len(B_{cls}(b))$ represents a class sub-set of a target object corresponding to the b-th object channel layer; H represents the number of rows of data matrix output by the object channel layer; W represents the number of columns of the data matrix output by the object channel layer; Anchor represents all Anchor sets; Mask(p, a) indicates whether there is a label box at a position corresponding to a pixel p; BCELoss represents a BCE loss function; $P_{cls}(p, a, c)$ represents a class prediction value; $GT_{cls}(p, a, c)$ represents a class real value.

12. The method according to claim 7, further comprising:

acquiring a verification set, wherein the verification set includes multiple verification datasets in one-to-one correspondence with the multiple training datasets, and each verification dataset includes label data of one or more classes of target objects;

inputting the multiple verification datasets into the object detection model respectively to obtain accuracy rates of the multiple verification datasets; and summing the accuracy rates of the multiple verification datasets to be as a total accuracy rate of the trained object detection model, or taking the accuracy rates of the multiple verification datasets together as the total accuracy rate of the trained object detection model.

13. A non-transitory computer-readable storage medium having stored instructions that, when run on a computer, cause the computer to perform the object detection module training method according to claim 7.

14. An object detection model training method, comprising:

acquiring a training set, wherein the training set includes multiple training datasets, each training dataset includes label data of multiple classes of target objects, and classes of target objects labeled by at least two datasets of the multiple datasets are different;

determining an optimal detection model, wherein the optimal detection model is a detection model with the highest accuracy rate among historical training detection models, and the historical training detection models include detection models each whose parameter is updated after each iteration training; and performing iterative training on the detection model according to the training set; and perform pseudo-label labeling on the training set according to the optimal detection model, so as to continue to train the detection model to obtain an object detection model, wherein performing the pseudo-label labeling on the training set according to the optimal detection model to obtain the object detection model includes:

performing pseudo-label labeling on lacking target objects in each training dataset of the training set according to the optimal detection model to obtain positive sample label data and negative sample label data, wherein the lacking target objects are target objects whose classes are not labeled by the training dataset;

determining a positive sample loss value according to the positive sample label data and a positive sample loss function;

determining a negative sample loss value according to the negative sample label data and a negative sample loss function;

adjusting the parameter of the detection model according to a total loss value, wherein the total loss value is determined according to a first loss value, the positive sample loss value and the negative sample loss value; and determining, in a case where a total loss function converges, the detection model as the object detection model, wherein the total loss function includes a first loss function, the positive sample loss function, and the negative sample loss function.

15. The method according to claim 14, wherein performing labeling on the lacking target objects in the training set according to the optimal detection model to obtain positive sample label data and negative sample label data includes:

inputting the training set into the optimal detection model to determine a detection score of the optimal detection model for each lacking target object;

for each lacking target object, under a condition in which the detection score of the optimal detection model for the lacking target object is greater than or equal to a positive sample score threshold, determining label data corresponding to the lacking target object as the positive sample label data; and for each lacking target object, under a condition in which the detection score of the optimal detection model for the lacking target object is less than or equal to a negative sample score threshold, determining label data corresponding to the lacking target object as the negative sample label data.

16. The method according to claim 15, wherein the positive sample score threshold and the negative sample score threshold are determined according to the following steps:

acquiring a verification set, wherein the verification set includes multiple verification datasets corresponding to the multiple training datasets, each verification dataset includes label data of one or more classes of target objects, and an accuracy rate of the detection model is determined according to the verification set;

determining a detection score of the optimal detection model for each target object in the verification set;

determining the negative sample score threshold according to the detection score of each target object and a preset recall rate; and determining the positive sample score threshold according to the detection score of each target object and a preset precision.

17. The method according to claim 12, further comprising:

determining a first weight, a second weight and a third weight; and determining a total loss value according to a product of the first weight and a first loss value, a product of the second weight and a positive sample loss value, and a product of the third weight and a negative sample loss value.

18. A non-transitory computer-readable storage medium having stored instructions that, when run on a computer, cause the computer to perform the object detection module training method according to claim 14.

* * * * *